US012212953B2

(12) United States Patent
Breebaart et al.

(10) Patent No.: US 12,212,953 B2
(45) **Date of Patent: *Jan. 28, 2025**

(54) METHOD, APPARATUS OR SYSTEMS FOR PROCESSING AUDIO OBJECTS

(71) Applicants: Dolby Laboratories Licensing Corporation, San Francisco, CA (US); DOLBY INTERNATIONAL AB, Dublin (IE)

(72) Inventors: Dirk Jeroen Breebaart, Ultimo (AU); Lie Lu, San Francisco, CA (US); Nicolas R. Tsingos, San Francisco, CA (US); Antonio Mateos Sole, Barcelona (ES)

(73) Assignees: Dolby Laboratories Licensing Corporation, San Francisco, CA (US); Dolby International AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,704

(22) Filed: Jul. 10, 2023

(65) Prior Publication Data

US 2023/0353970 A1 Nov. 2, 2023

Related U.S. Application Data

(60) Continuation of application No. 17/372,833, filed on Jul. 12, 2021, now Pat. No. 11,736,890, which is a (Continued)

(30) Foreign Application Priority Data

Jul. 31, 2013 (ES) ............................ ESP201331193

(51) Int. Cl.

*G10L 19/20* (2013.01)
*G10L 19/00* (2013.01)

(Continued)

(52) U.S. Cl.

CPC ............. *H04S 7/308* (2013.01); *G10L 19/00* (2013.01); *G10L 19/008* (2013.01);

(Continued)

(58) Field of Classification Search

CPC . H04S 7/30; H04S 7/304; H04S 7/303; H04S 7/308; H04S 7/00; H04S 7/302;

(Continued)

(56) References Cited

U.S. PATENT DOCUMENTS 8,363,865 B1 1/2013 Bottum
8,908,874 B2 12/2014 Johnston (Continued)

FOREIGN PATENT DOCUMENTS

CN 101479785 7/2009
CN 101981811 2/2011

(Continued)

OTHER PUBLICATIONS

Potard, G. et al "Decorrelation Techniques for the Rendering of Apparent Sound Source Width in 3D Audio Displays" Proc. of the International Conference on Digital Audio effects, Oct. 5, 2004, pp. 280-284.

(Continued)

*Primary Examiner* — Leshui Zhang

(57) ABSTRACT

Diffuse or spatially large audio objects may be identified for special processing. A decorrelation process may be performed on audio signals corresponding to the large audio objects to produce decorrelated large audio object audio signals. These decorrelated large audio object audio signals may be associated with object locations, which may be stationary or time-varying locations. For example, the decorrelated large audio object audio signals may be rendered to virtual or actual speaker locations. The output of such a rendering process may be input to a scene simplification (Continued)

process. The decorrelation, associating and/or scene simplification processes may be performed prior to a process of encoding the audio data.

9 Claims, 16 Drawing Sheets

Related U.S. Application Data continuation of application No. 16/820,769, filed on Mar. 17, 2020, now Pat. No. 11,064,310, which is a division of application No. 16/009,164, filed on Jun. 14, 2018, now Pat. No. 10,595,152, which is a continuation of application No. 15/490,613, filed on Apr. 18, 2017, now Pat. No. 10,003,907, which is a division of application No. 14/909,058, filed as application No. PCT/US2014/047966 on Jul. 24, 2014, now Pat. No. 9,654,895.

(60) Provisional application No. 61/885,805, filed on Oct. 2, 2013.

(51) Int. Cl.

| | |
|---|---|
| ***G10L 19/008*** | (2013.01) |
| ***G10L 19/018*** | (2013.01) |
| ***H04S 3/00*** | (2006.01) |
| ***H04S 7/00*** | (2006.01) |

(52) U.S. Cl.

CPC ............ *G10L 19/018* (2013.01); *G10L 19/20* (2013.01); *H04S 3/002* (2013.01); *H04S 2400/11* (2013.01); *H04S 2400/13* (2013.01); *H04S 2400/15* (2013.01); *H04S 2420/03* (2013.01); *H04S 2420/07* (2013.01)

(58) Field of Classification Search

CPC . H04S 3/002; H04S 3/008; H04S 3/00; H04S 2400/11; H04S 2400/13; H04S 2400/15; H04S 2420/03; H04S 2420/07; G10L 19/00; G10L 19/008; G10L 19/018; G10L 19/20; H04R 27/00; H04R 3/12

USPC ........ 381/1, 17, 18, 19, 20, 21, 22, 23, 300, 381/302, 301, 303, 304, 305, 30, 6, 307, 381/26, 61, 63, 119, 123, 111; 700/94

See application file for complete search history.

(56) References Cited

U.S. PATENT DOCUMENTS

| | | | | |
|---|---|---|---|---|
| 2003/0219130 | A1 | 11/2003 | Baumgarte et al. | |
| 2003/0219137 | A1 | 11/2003 | Fincham | |
| 2006/0165238 | A1* | 7/2006 | Spille | G10L 19/00 381/23 |
| 2007/0189202 | A1 | 8/2007 | Asati | |
| 2008/0123864 | A1 | 5/2008 | Reichelt | |
| 2008/0298597 | A1 | 12/2008 | Turku | |
| 2010/0014692 | A1 | 1/2010 | Schreiner | |
| 2010/0228368 | A1 | 9/2010 | Oh | |
| 2011/0022402 | A1* | 1/2011 | Engdegard | G10L 19/008 704/E19.001 |
| 2011/0040395 | A1 | 2/2011 | Kraemer | |
| 2011/0069850 | A1 | 3/2011 | Harma | |
| 2011/0194712 | A1* | 8/2011 | Potard | H04S 1/002 381/300 |
| 2011/0243338 | A1 | 10/2011 | Brown | |
| 2011/0274278 | A1 | 11/2011 | Kim | |
| 2012/0017075 | A1 | 1/2012 | Gokhale | |
| 2012/0057715 | A1* | 3/2012 | Johnston | H04S 7/30 381/63 |
| 2012/0170756 | A1 | 7/2012 | Kraemer | |
| 2012/0230497 | A1 | 9/2012 | Dressler | |
| 2012/0232910 | A1* | 9/2012 | Dressler | H04S 3/02 704/500 |
| 2013/0010969 | A1 | 1/2013 | Cho | |
| 2013/0170646 | A1 | 7/2013 | Yoo et al. | |
| 2014/0025386 | A1 | 1/2014 | Xiang | |
| 2014/0205115 | A1 | 7/2014 | Wang et al. | |
| 2014/0233917 | A1 | 8/2014 | Xiang | |

FOREIGN PATENT DOCUMENTS

| | | | | |
|---|---|---|---|---|
| CN | 102100088 | | 6/2011 | |
| CN | 101855917 | B | 7/2016 | |
| JP | 2002051399 | A | 2/2002 | |
| JP | 2002369152 | | 12/2002 | |
| JP | 2006516164 | A | 6/2006 | |
| JP | 2011-008258 | | 1/2011 | |
| JP | 2011527456 | A | 10/2011 | |
| JP | 2014-520491 | | 8/2014 | |
| JP | 2014-523190 | | 9/2014 | |
| JP | 6804495 | | 12/2020 | |
| JP | 7116144 | B2 | 8/2022 | |
| JP | 7493559 | B2 | 5/2024 | |
| RS | 1332 | U | 8/2013 | |
| RU | 2411594 | A | 5/2009 | |
| RU | 2376654 | | 12/2009 | |
| WO | 2004/036548 | | 4/2004 | |
| WO | 2007078254 | A2 | 7/2007 | |
| WO | 2012033950 | A1 | 3/2012 | |
| WO | 2013/006338 | | 1/2013 | |
| WO | 2013006325 | A1 | 1/2013 | |
| WO | 2013006330 | A2 | 1/2013 | |
| WO | 2013006338 | A2 | 1/2013 | |
| WO | WO-2013108200 | A1 * | 7/2013 | G10L 19/00 |
| WO | 2014/099285 | | 6/2014 | |

OTHER PUBLICATIONS

Pulkki, Ville "Compensating Displacement of Amplitude-Panned Virtual Sources" AES Conference, 22nd International Conference: Virtual, Synthetic, and Entertainment Audio, Jun. 1, 2002.

Robinson, C. et al "Automated Speech/Other Discrimination for Loudness Monitoring" AES Convention for Signal Processing, May 1, 2005.

Stanojevic, T. "Some Technical Possibilities of Using the Total Surround Sound Concept in the Motion Picture Technology", 133rd SMPTE Technical Conference and Equipment Exhibit, Los Angeles Convention Center, Los Angeles, California, Oct. 26-29, 1991.

Stanojevic, T. et al "Designing of TSS Halls" 13th International Congress on Acoustics, Yugoslavia, 1989.

Stanojevic, T. et al "The Total Surround Sound (TSS) Processor" SMPTE Journal, Nov. 1994.

Stanojevic, T. et al "The Total Surround Sound System", 86th AES Convention, Hamburg, Mar. 7-10, 1989.

Stanojevic, T. et al "TSS System and Live Performance Sound" 88th AES Convention, Montreux, Mar. 13-16, 1990.

Stanojevic, T. et al. "TSS Processor" 135th SMPTE Technical Conference, Oct. 29-Nov. 2, 1993, Los Angeles Convention Center, Los Angeles, California, Society of Motion Picture and Television Engineers.

Stanojevic, Tomislav "3-D Sound in Future HDTV Projection Systems" presented at the 132nd SMPTE Technical Conference, Jacob K. Javits Convention Center, New York City, Oct. 13-17, 1990.

Stanojevic, Tomislav "Surround Sound for a New Generation of Theaters, Sound and Video Contractor" Dec. 20, 1995.

Stanojevic, Tomislav, "Virtual Sound Sources in the Total Surround Sound System" Proc. 137th SMPTE Technical Conference and World Media Expo, Sep. 6-9, 1995, New Orleans Convention Center, New Orleans, Louisiana.

* cited by examiner

METHOD, APPARATUS OR SYSTEMS FOR PROCESSING AUDIO OBJECTS

CROSS-REFERENCE TO RELATED APPLICATIONS

This application is a continuation application of U.S. patent application Ser. No. 17/372,833 filed on Jul. 12, 2021, which is a continuation application of U.S. patent application Ser. No. 16/820,769 filed on Mar. 17, 2020, (now U.S. Pat. No. 11,064,310) which is a divisional application of U.S. patent application Ser. No. 16/009,164 filed on Jun. 14, 2018 (now U.S. Pat. No. 10,595,152), which is a continuation application of U.S. patent application Ser. No. 15/490,613 filed on Apr. 18, 2017 (now U.S. Pat. No. 10,003,907), which is a divisional application of U.S. patent application Ser. No. 14/909,058 filed on Jan. 29, 2016 (now U.S. Pat. No. 9,654,895), which is the U.S. national stage entry of International Application No. PCT/US2014/047966 filed Jul. 24, 2014, which claims the benefit of priority from U.S. Provisional Patent Application No. 61/885,805 filed Oct. 2, 2013 and Spanish Patent Application No. P201331193 filed Jul. 31, 2013, all incorporated herein by reference.

TECHNICAL FIELD

This disclosure relates to processing audio data. In particular, this disclosure relates to processing audio data corresponding to diffuse or spatially large audio objects.

BACKGROUND

Since the introduction of sound with film in 1927, there has been a steady evolution of technology used to capture the artistic intent of the motion picture sound track and to reproduce this content. In the 1970s Dolby introduced a cost-effective means of encoding and distributing mixes with 3 screen channels and a mono surround channel. Dolby brought digital sound to the cinema during the 1990s with a 5.1 channel format that provides discrete left, center and right screen channels, left and right surround arrays and a subwoofer channel for low-frequency effects. Dolby Surround 7.1, introduced in 2010, increased the number of surround channels by splitting the existing left and right surround channels into four "zones."

Both cinema and home theater audio playback systems are becoming increasingly versatile and complex. Home theater audio playback systems are including increasing numbers of speakers. As the number of channels increases and the loudspeaker layout transitions from a planar two-dimensional (2D) array to a three-dimensional (3D) array including elevation, reproducing sounds in a playback environment is becoming an increasingly complex process. Improved audio processing methods would be desirable.

SUMMARY

Improved methods for processing diffuse or spatially large audio objects are provided. As used herein, the term "audio object" refers to audio signals (also referred to herein as "audio object signals") and associated metadata that may be created or "authored" without reference to any particular playback environment. The associated metadata may include audio object position data, audio object gain data, audio object size data, audio object trajectory data, etc. As used herein, the term "rendering" refers to a process of transforming audio objects into speaker feed signals for a particular playback environment. A rendering process may be performed, at least in part, according to the associated metadata and according to playback environment data. The playback environment data may include an indication of a number of speakers in a playback environment and an indication of the location of each speaker within the playback environment.

A spatially large audio object is not intended to be perceived as a point sound source, but should instead be perceived as covering a large spatial area. In some instances, a large audio object should be perceived as surrounding the listener. Such audio effects may not be achievable by panning alone, but instead may require additional processing. In order to create a convincing spatial object size, or spatial diffuseness, a significant proportion of the speaker signals in a playback environment should be mutually independent, or at least be uncorrelated (for example, independent in terms of first-order cross correlation or covariance). A sufficiently complex rendering system, such as a rendering system for a theater, may be capable of providing such decorrelation. However, less complex rendering systems, such as those intended for home theater systems, may not be capable of providing adequate decorrelation.

Some implementations described herein may involve identifying diffuse or spatially large audio objects for special processing. A decorrelation process may be performed on audio signals corresponding to the large audio objects to produce decorrelated large audio object audio signals. These decorrelated large audio object audio signals may be associated with object locations, which may be stationary or time-varying locations. The associating process may be independent of an actual playback speaker configuration. For example, the decorrelated large audio object audio signals may be rendered to virtual speaker locations. In some implementations, output of such a rendering process may be input to a scene simplification process.

Accordingly, at least some aspects of this disclosure may be implemented in a method that may involve receiving audio data comprising audio objects. The audio objects may include audio object signals and associated metadata. The metadata may include at least audio object size data.

The method may involve determining, based on the audio object size data, a large audio object having an audio object size that is greater than a threshold size and performing a decorrelation process on audio signals of the large audio object to produce decorrelated large audio object audio signals. The method may involve associating the decorrelated large audio object audio signals with object locations. The associating process may be independent of an actual playback speaker configuration. The actual playback speaker configuration may eventually be used to render the decorrelated large audio object audio signals to speakers of a playback environment.

The method may involve receiving decorrelation metadata for the large audio object. The decorrelation process may be performed, at least in part, according to the decorrelation metadata. The method may involve encoding audio data output from the associating process. In some implementations, the encoding process may not involve encoding decorrelation metadata for the large audio object.

The object locations may include locations corresponding to at least some of the audio object position data of the received audio objects. At least some of the object locations may be stationary. However, in some implementations at least some of the object locations may vary over time.

The associating process may involve rendering the decorrelated large audio object audio signals according to virtual speaker locations. In some examples, the receiving process may involve receiving one or more audio bed signals corresponding to speaker locations. The method may involve mixing the decorrelated large audio object audio signals with at least some of the received audio bed signals or the received audio object signals. The method may involve outputting the decorrelated large audio object audio signals as additional audio bed signals or audio object signals.

The method may involve applying a level adjustment process to the decorrelated large audio object audio signals. In some implementations, the large audio object metadata may include audio object position metadata and the level adjustment process may depend, at least in part, on the audio object size metadata and the audio object position metadata of the large audio object.

The method may involve attenuating or deleting the audio signals of the large audio object after the decorrelation process is performed. However, in some implementations, the method may involve retaining audio signals corresponding to a point source contribution of the large audio object after the decorrelation process is performed.

The large audio object metadata may include audio object position metadata. In some such implementations, the method may involve computing contributions from virtual sources within an audio object area or volume defined by the large audio object position data and the large audio object size data. The method also may involve determining a set of audio object gain values for each of a plurality of output channels based, at least in part, on the computed contributions. The method may involve mixing the decorrelated large audio object audio signals with audio signals for audio objects that are spatially separated by a threshold amount of distance from the large audio object.

In some implementations, the method may involve performing an audio object clustering process after the decorrelation process. In some such implementations, the audio object clustering process may be performed after the associating process.

The method may involve evaluating the audio data to determine content type. In some such implementations, the decorrelation process may be selectively performed according to the content type. For example, an amount of decorrelation to be performed may depend on the content type. The decorrelation process may involve delays, all-pass filters, pseudo-random filters and/or reverberation algorithms.

The methods disclosure herein may be implemented via hardware, firmware, software stored in one or more non-transitory media, and/or combinations thereof. For example, at least some aspects of this disclosure may be implemented in an apparatus that includes an interface system and a logic system. The interface system may include a user interface and/or a network interface. In some implementations, the apparatus may include a memory system. The interface system may include at least one interface between the logic system and the memory system.

The logic system may include at least one processor, such as a general purpose single- or multi-chip processor, a digital signal processor (DSP), an application specific integrated circuit (ASIC), a field programmable gate array (FPGA) or other programmable logic device, discrete gate or transistor logic, discrete hardware components, and/or combinations thereof.

In some implementations, the logic system may be capable of receiving, via the interface system, audio data comprising audio objects. The audio objects may include audio object signals and associated metadata. In some implementations, the metadata includes at least audio object size data. The logic system may be capable of determining, based on the audio object size data, a large audio object having an audio object size that is greater than a threshold size and of performing a decorrelation process on audio signals of the large audio object to produce decorrelated large audio object audio signals. The logic system may be capable of associating the decorrelated large audio object audio signals with object locations.

The associating process may be independent of an actual playback speaker configuration. For example, the associating process may involve rendering the decorrelated large audio object audio signals according to virtual speaker locations. The actual playback speaker configuration may eventually be used to render the decorrelated large audio object audio signals to speakers of a playback environment.

The logic system may be capable of receiving, via the interface system, decorrelation metadata for the large audio object. The decorrelation process may be performed, at least in part, according to the decorrelation metadata.

The logic system may be capable of encoding audio data output from the associating process. In some implementations, the encoding process may not involve encoding decorrelation metadata for the large audio object.

At least some of the object locations may be stationary. However, at least some of the object locations may vary over time. The large audio object metadata may include audio object position metadata. The object locations may include locations corresponding to at least some of the audio object position metadata of the received audio objects.

The receiving process may involve receiving one or more audio bed signals corresponding to speaker locations. The logic system may be capable of mixing the decorrelated large audio object audio signals with at least some of the received audio bed signals or the received audio object signals. The logic system may be capable of outputting the decorrelated large audio object audio signals as additional audio bed signals or audio object signals.

The logic system may be capable of applying a level adjustment process to the decorrelated large audio object audio signals. The level adjustment process may depend, at least in part, on the audio object size metadata and the audio object position metadata of the large audio object.

The logic system may be capable of attenuating or deleting the audio signals of the large audio object after the decorrelation process is performed. However, the apparatus may be capable of retaining audio signals corresponding to a point source contribution of the large audio object after the decorrelation process is performed.

The logic system may be capable of computing contributions from virtual sources within an audio object area or volume defined by the large audio object position data and the large audio object size data. The logic system may be capable of determining a set of audio object gain values for each of a plurality of output channels based, at least in part, on the computed contributions. The logic system may be capable of mixing the decorrelated large audio object audio signals with audio signals for audio objects that are spatially separated by a threshold amount of distance from the large audio object.

The logic system may be capable of performing an audio object clustering process after the decorrelation process. In some implementations, the audio object clustering process may be performed after the associating process.

The logic system may be capable of evaluating the audio data to determine content type. The decorrelation process may be selectively performed according to the content type.

For example, an amount of decorrelation to be performed depends on the content type. The decorrelation process may involve delays, all-pass filters, pseudo-random filters and/or reverberation algorithms.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DESCRIPTION OF EXAMPLE EMBODIMENTS

The following description is directed to certain implementations for the purposes of describing some innovative aspects of this disclosure, as well as examples of contexts in which these innovative aspects may be implemented. However, the teachings herein can be applied in various different ways. For example, while various implementations are described in terms of particular playback environments, the teachings herein are widely applicable to other known playback environments, as well as playback environments that may be introduced in the future. Moreover, the described implementations may be implemented, at least in part, in various devices and systems as hardware, software, firmware, cloud-based systems, etc. Accordingly, the teachings of this disclosure are not intended to be limited to the implementations shown in the figures and/or described herein, but instead have wide applicability.

Figure 1:
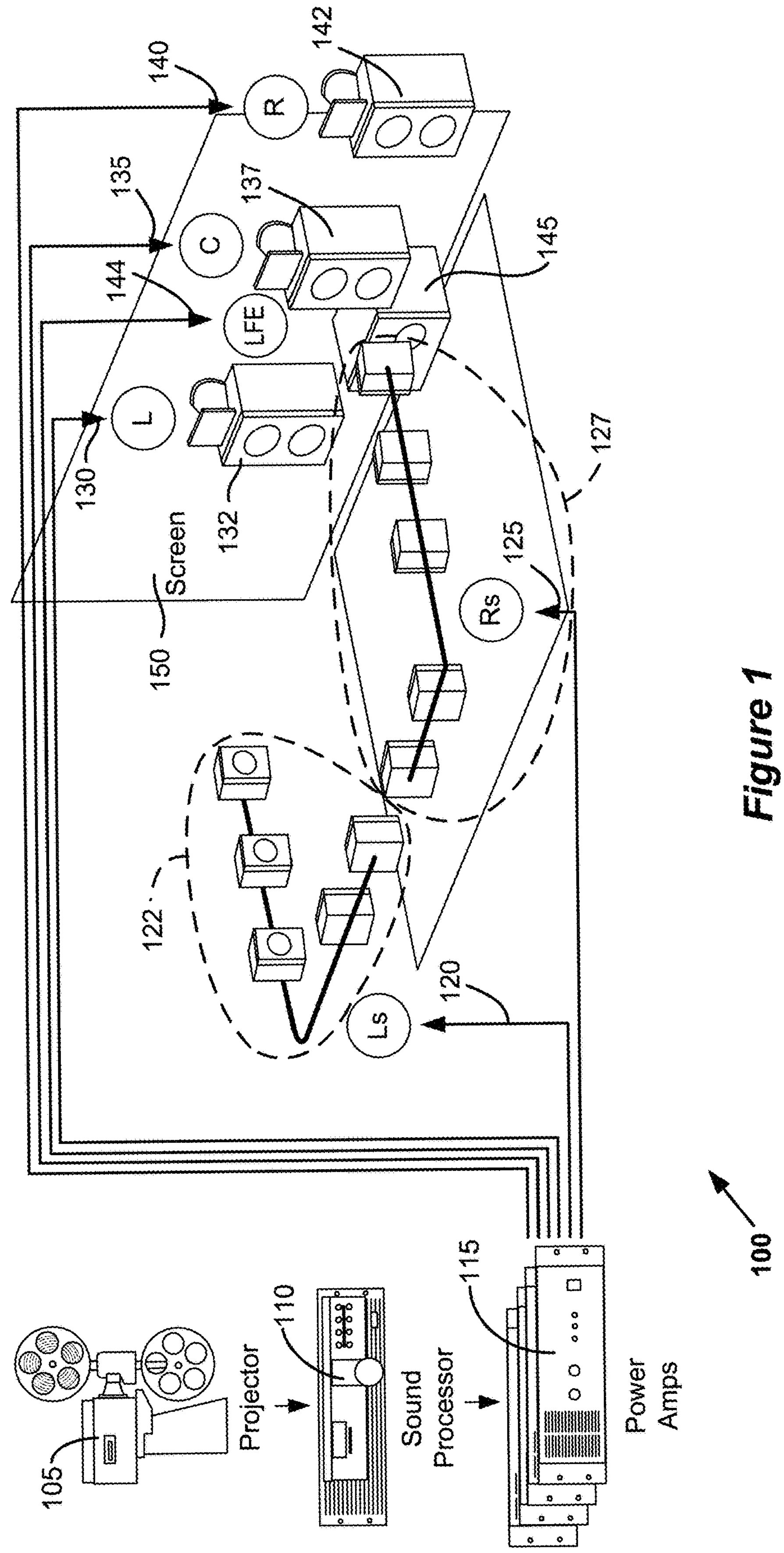
Figure 1 (PRIOR ART)
FIG. 1 shows an example of a playback environment having a Dolby Surround 5.1 configuration.

FIG. 1 shows an example of a playback environment having a Dolby Surround 5.1 configuration. In this example, the playback environment is a cinema playback environment. Dolby Surround 5.1 was developed in the 1990s, but this configuration is still widely deployed in home and cinema playback environments. In a cinema playback environment, a projector 105 may be configured to project video images, e.g. for a movie, on a screen 150. Audio data may be synchronized with the video images and processed by the sound processor 110. The power amplifiers 115 may provide speaker feed signals to speakers of the playback environment 100.

The Dolby Surround 5.1 configuration includes a left surround channel 120 for the left surround array 122 and a right surround channel 125 for the right surround array 127. The Dolby Surround 5.1 configuration also includes a left channel 130 for the left speaker array 132, a center channel 135 for the center speaker array 137 and a right channel 140 for the right speaker array 142. In a cinema environment, these channels may be referred to as a left screen channel, a center screen channel and a right screen channel, respectively. A separate low-frequency effects (LFE) channel 144 is provided for the subwoofer 145.

Figure 2:
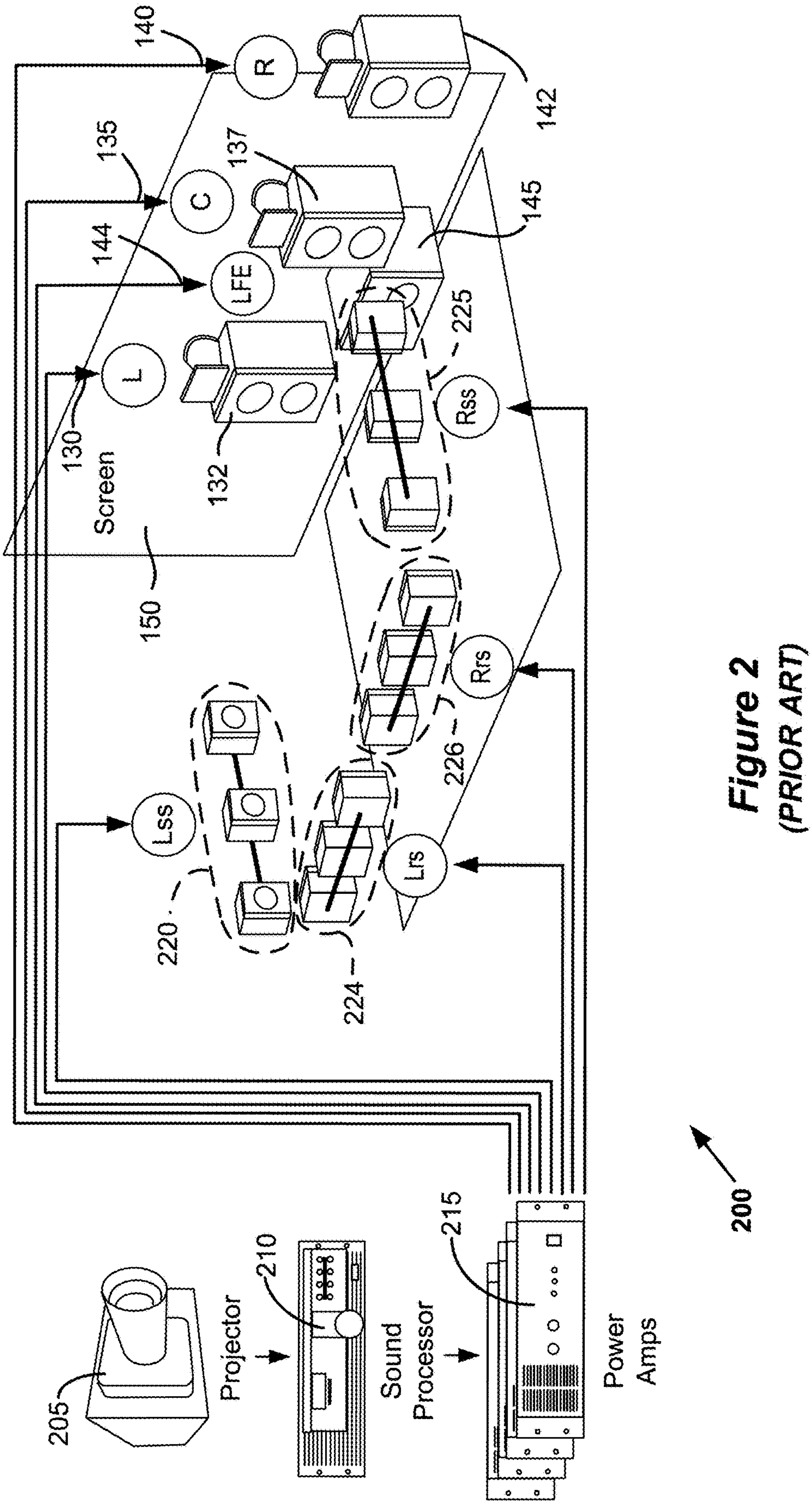
Figure 2 (PRIOR ART)
FIG. 2 shows an example of a playback environment having a Dolby Surround 7.1 configuration.

In 2010, Dolby provided enhancements to digital cinema sound by introducing Dolby Surround 7.1. FIG. 2 shows an example of a playback environment having a Dolby Surround 7.1 configuration. A digital projector 205 may be configured to receive digital video data and to project video images on the screen 150. Audio data may be processed by the sound processor 210. The power amplifiers 215 may provide speaker feed signals to speakers of the playback environment 200.

Like Dolby Surround 5.1, the Dolby Surround 7.1 configuration includes a left channel 130 for the left speaker array 132, a center channel 135 for the center speaker array 137, a right channel 140 for the right speaker array 142 and an LFE channel 144 for the subwoofer 145. The Dolby Surround 7.1 configuration includes a left side surround (Lss) array 220 and a right side surround (Rss) array 225, each of which may be driven by a single channel.

However, Dolby Surround 7.1 increases the number of surround channels by splitting the left and right surround channels of Dolby Surround 5.1 into four zones: in addition to the left side surround array 220 and the right side surround array 225, separate channels are included for the left rear surround (Lrs) speakers 224 and the right rear surround (Rrs) speakers 226. Increasing the number of surround zones within the playback environment 200 can significantly improve the localization of sound.

In an effort to create a more immersive environment, some playback environments may be configured with increased numbers of speakers, driven by increased numbers of channels. Moreover, some playback environments may include speakers deployed at various elevations, some of which may be "height speakers" configured to produce sound from an area above a seating area of the playback environment.

Figure 3A:
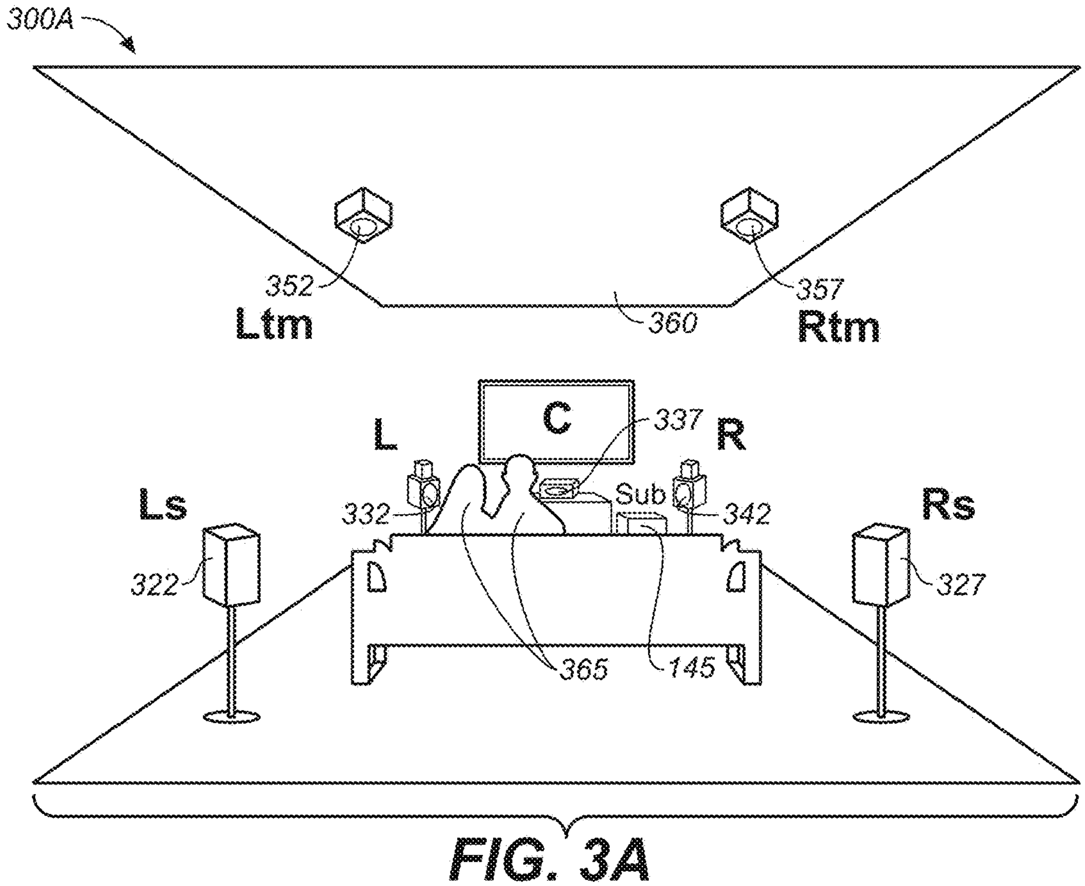
FIGS. 3A and 3B illustrate two examples of home theater playback environments that include height speaker configurations.
Figure 3B:
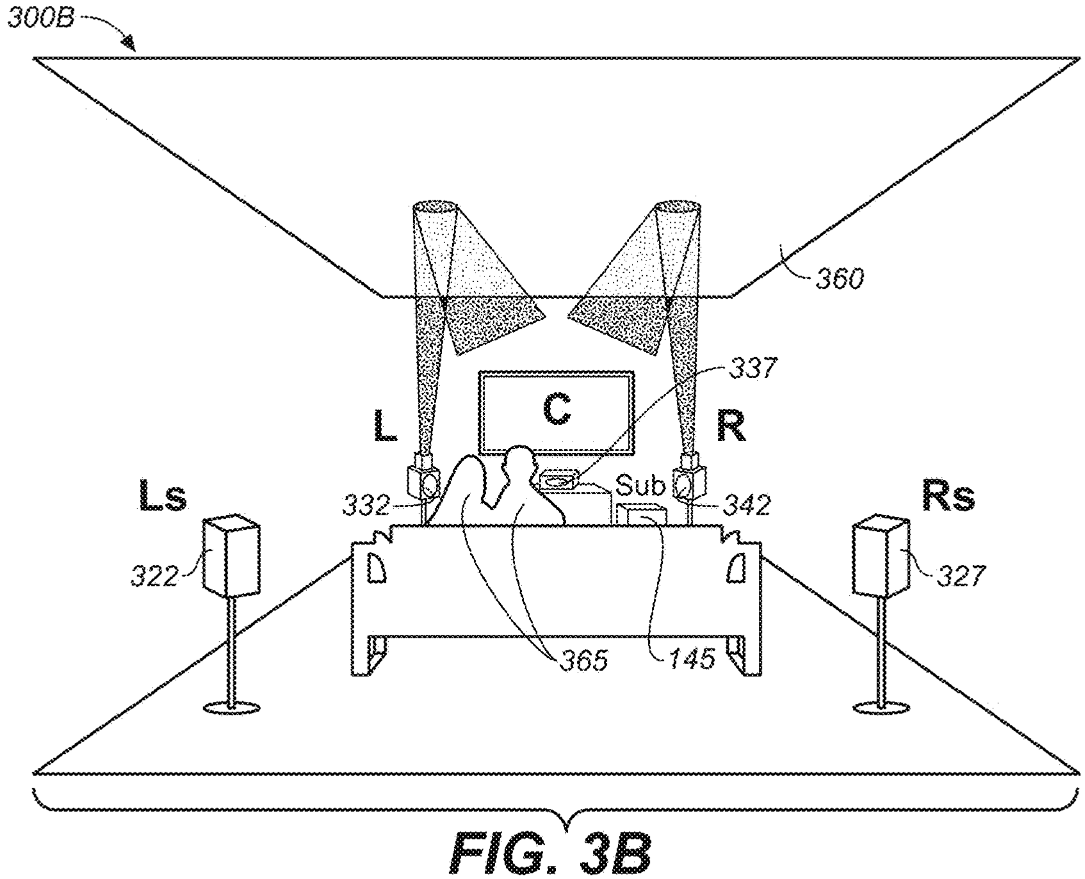

FIGS. 3A and 3B illustrate two examples of home theater playback environments that include height speaker configurations. In these examples, the playback environments 300*a* and 300*b* include the main features of a Dolby Surround 5.1 configuration, including a left surround speaker 322, a right surround speaker 327, a left speaker 332, a right speaker 342, a center speaker 337 and a subwoofer 145. However, the playback environment 300 includes an extension of the Dolby Surround 5.1 configuration for height speakers, which may be referred to as a Dolby Surround 5.1.2 configuration.

FIG. 3A illustrates an example of a playback environment having height speakers mounted on a ceiling 360 of a home theater playback environment. In this example, the playback environment 300*a* includes a height speaker 352 that is in a left top middle (Ltm) position and a height speaker 357 that is in a right top middle (Rtm) position. In the example shown in FIG. 3B, the left speaker 332 and the right speaker 342 are Dolby Elevation speakers that are configured to reflect sound from the ceiling 360. If properly configured, the reflected sound may be perceived by listeners 365 as if the sound source originated from the ceiling 360. However, the number and configuration of speakers is merely provided by way of example. Some current home theater implementations provide for up to 34 speaker positions, and contemplated home theater implementations may allow yet more speaker positions.

Accordingly, the modern trend is to include not only more speakers and more channels, but also to include speakers at differing heights. As the number of channels increases and the speaker layout transitions from \2D to 3D, the tasks of positioning and rendering sounds becomes increasingly difficult.

Accordingly, Dolby has developed various tools, including but not limited to user interfaces, which increase functionality and/or reduce authoring complexity for a 3D audio sound system. Some such tools may be used to create audio objects and/or metadata for audio objects.

Figure 4A:
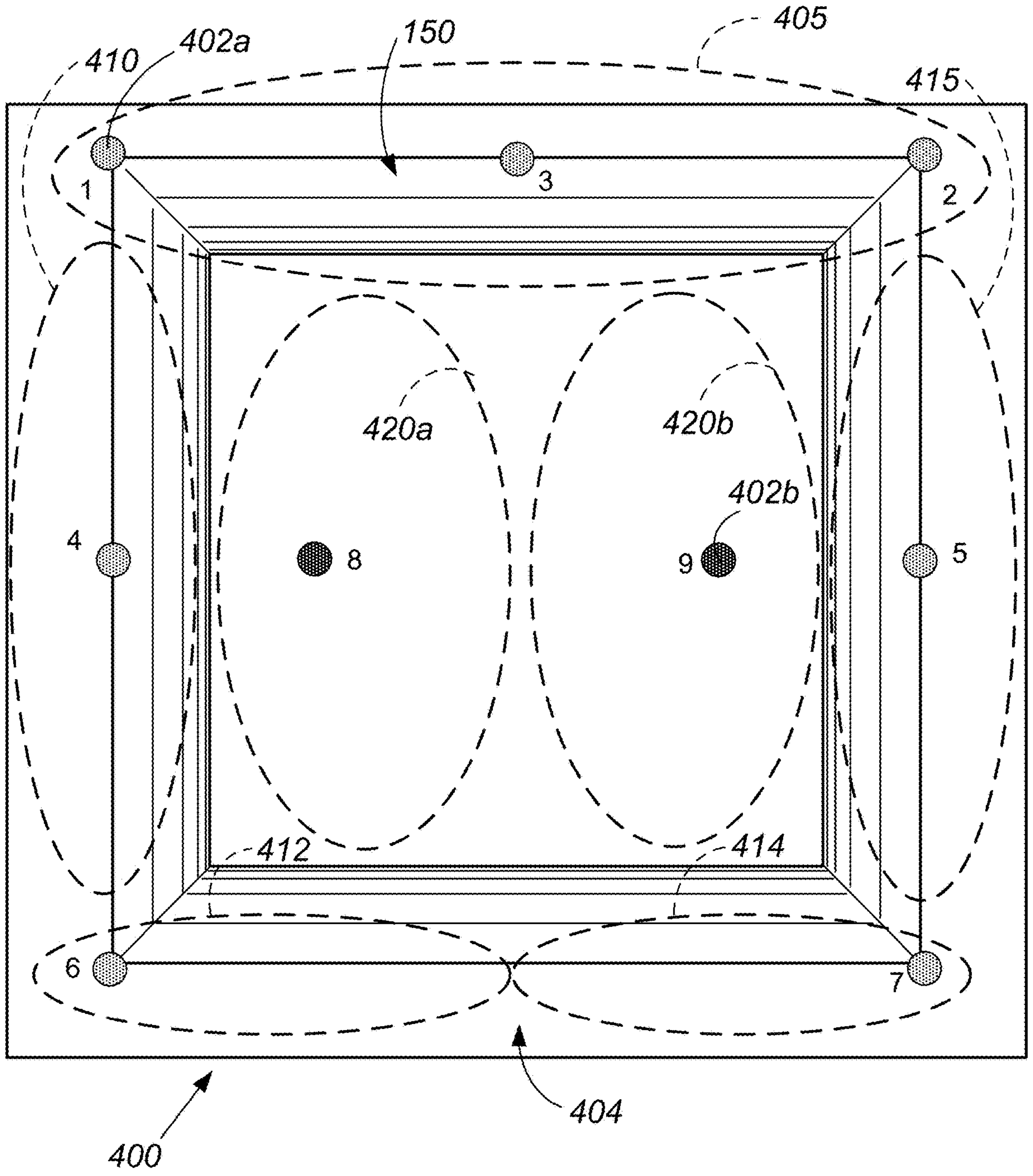
FIG. 4A shows an example of a graphical user interface (GUI) that portrays speaker zones at varying elevations in a virtual playback environment.

FIG. 4A shows an example of a graphical user interface (GUI) that portrays speaker zones at varying elevations in a virtual playback environment. GUI 400 may, for example, be displayed on a display device according to instructions from a logic system, according to signals received from user input devices, etc. Some such devices are described below with reference to FIG. 11.

As used herein with reference to virtual playback environments such as the virtual playback environment 404, the term "speaker zone" generally refers to a logical construct that may or may not have a one-to-one correspondence with a speaker of an actual playback environment. For example, a "speaker zone location" may or may not correspond to a particular speaker location of a cinema playback environment. Instead, the term "speaker zone location" may refer generally to a zone of a virtual playback environment. In some implementations, a speaker zone of a virtual playback environment may correspond to a virtual speaker, e.g., via the use of virtualizing technology such as Dolby Headphone,™ (sometimes referred to as Mobile Surround™), which creates a virtual surround sound environment in real time using a set of two-channel stereo headphones. In GUI 400, there are seven speaker zones 402*a* at a first elevation and two speaker zones 402*b* at a second elevation, making a total of nine speaker zones in the virtual playback environment 404. In this example, speaker zones 1-3 are in the front area 405 of the virtual playback environment 404. The front area 405 may correspond, for example, to an area of a cinema playback environment in which a screen 150 is located, to an area of a home in which a television screen is located, etc.

Here, speaker zone 4 corresponds generally to speakers in the left area 410 and speaker zone 5 corresponds to speakers in the right area 415 of the virtual playback environment 404. Speaker zone 6 corresponds to a left rear area 412 and speaker zone 7 corresponds to a right rear area 414 of the virtual playback environment 404. Speaker zone 8 corresponds to speakers in an upper area 420*a* and speaker zone 9 corresponds to speakers in an upper area 420*b*, which may be a virtual ceiling area. Accordingly, the locations of speaker zones 1-9 that are shown in FIG. 4A may or may not correspond to the locations of speakers of an actual playback environment. Moreover, other implementations may include more or fewer speaker zones and/or elevations.

In various implementations described herein, a user interface such as GUI 400 may be used as part of an authoring tool and/or a rendering tool. In some implementations, the authoring tool and/or rendering tool may be implemented via software stored on one or more non-transitory media. The authoring tool and/or rendering tool may be implemented (at least in part) by hardware, firmware, etc., such as the logic system and other devices described below with reference to FIG. 11. In some authoring implementations, an associated authoring tool may be used to create metadata for associated audio data. The metadata may, for example, include data indicating the position and/or trajectory of an audio object in a three-dimensional space, speaker zone constraint data, etc. The metadata may be created with respect to the speaker zones 402 of the virtual playback environment 404, rather than with respect to a particular speaker layout of an actual playback environment. A rendering tool may receive audio data and associated metadata, and may compute audio gains and speaker feed signals for a playback environment. Such audio gains and speaker feed signals may be computed according to an amplitude panning process, which can create a perception that a sound is coming from a position P in the playback environment. For example, speaker feed signals may be provided to speakers 1 through N of the playback environment according to the following equation:

$$x_i(t)=g_i x(t),\ i=1, \ldots N \qquad \text{(Equation 1)}$$

In Equation 1, xi(t) represents the speaker feed signal to be applied to speaker i, gi represents the gain factor of the corresponding channel, x(t) represents the audio signal and t represents time. The gain factors may be determined, for example, according to the amplitude panning methods described in Section 2, pages 3-4 of V. Pulkki, *Compensating Displacement of Amplitude-Panned Virtual Sources* (Audio Engineering Society (AES) International Conference on Virtual, Synthetic and Entertainment Audio), which is hereby incorporated by reference. In some implementations, the gains may be frequency dependent. In some implementations, a time delay may be introduced by replacing x(t) by x(t−Δt).

In some rendering implementations, audio reproduction data created with reference to the speaker zones 402 may be mapped to speaker locations of a wide range of playback environments, which may be in a Dolby Surround 5.1 configuration, a Dolby Surround 7.1 configuration, a Hamasaki 22.2 configuration, or another configuration. For example, referring to FIG. 2, a rendering tool may map audio reproduction data for speaker zones 4 and 5 to the left side surround array 220 and the right side surround array 225 of a playback environment having a Dolby Surround 7.1 configuration. Audio reproduction data for speaker zones 1, 2 and 3 may be mapped to the left screen channel 230, the right screen channel 240 and the center screen channel 235, respectively. Audio reproduction data for speaker zones 6 and 7 may be mapped to the left rear surround speakers 224 and the right rear surround speakers 226.

Figure 4B:
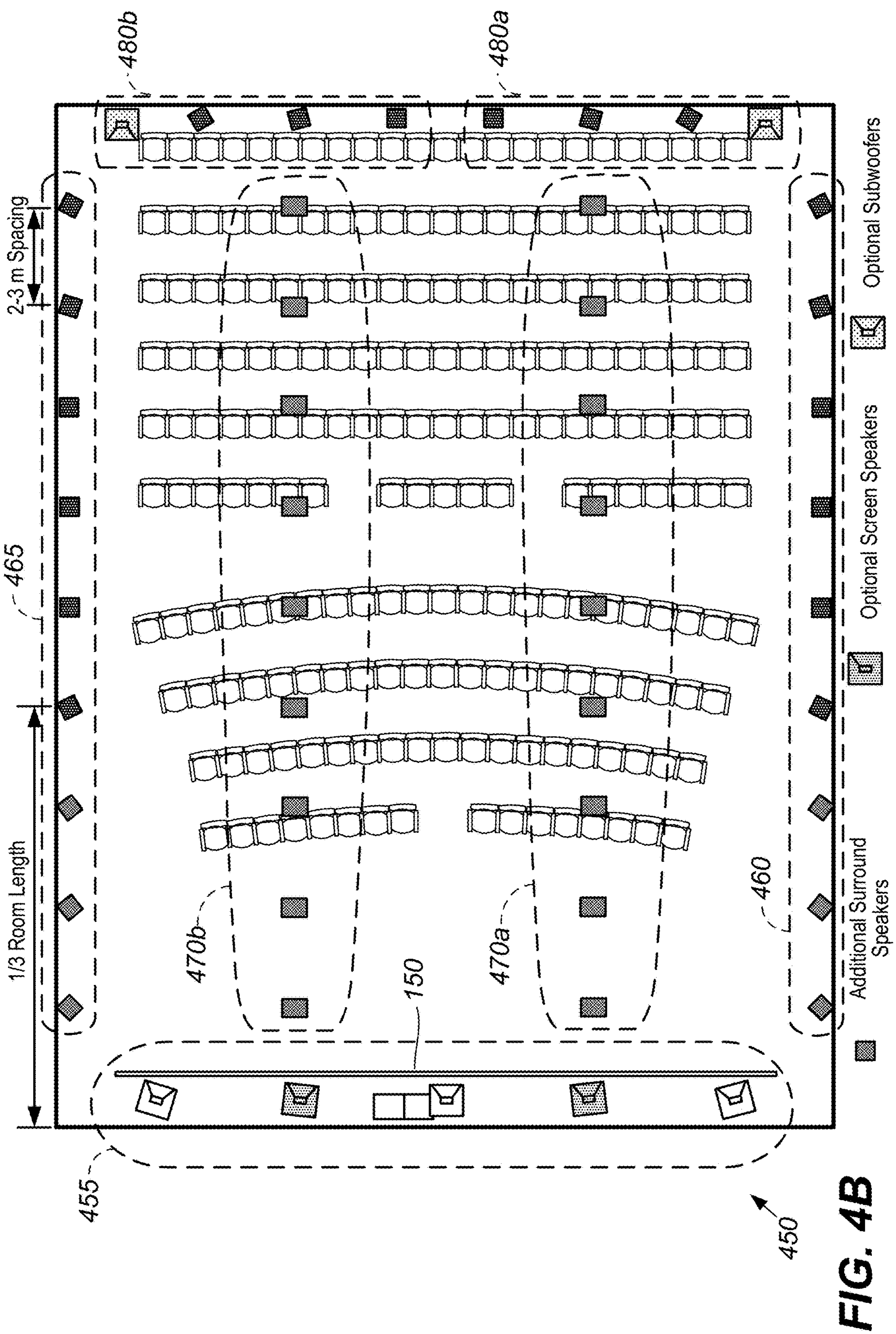
FIG. 4B shows an example of another playback environment.

FIG. 4B shows an example of another playback environment. In some implementations, a rendering tool may map audio reproduction data for speaker zones 1, 2 and 3 to corresponding screen speakers 455 of the playback environment 450. A rendering tool may map audio reproduction data for speaker zones 4 and 5 to the left side surround array 460 and the right side surround array 465 and may map audio reproduction data for speaker zones 8 and9 to left overhead speakers 470*a* and right overhead speakers 470*b*. Audio reproduction data for speaker zones 6 and 7 may be mapped to left rear surround speakers 480*a* and right rear surround speakers 480*b*.

In some authoring implementations, an authoring tool may be used to create metadata for audio objects. The metadata may indicate the 3D position of the object, rendering constraints, content type (e.g. dialog, effects, etc.) and/or other information. Depending on the implementation, the metadata may include other types of data, such as width data, gain data, trajectory data, etc. Some audio objects may be static, whereas others may move.

Audio objects are rendered according to their associated metadata, which generally includes positional metadata indicating the position of the audio object in a three-dimensional space at a given point in time. When audio objects are monitored or played back in a playback environment, the audio objects are rendered according to the positional metadata using the speakers that are present in the playback environment, rather than being output to a predetermined physical channel, as is the case with traditional, channel-based systems such as Dolby 5.1 and Dolby 7.1.

In addition to positional metadata, other types of metadata may be necessary to produce intended audio effects. For example, in some implementations, the metadata associated with an audio object may indicate audio object size, which may also be referred to as "width." Size metadata may be used to indicate a spatial area or volume occupied by an audio object. A spatially large audio object should be perceived as covering a large spatial area, not merely as a point sound source having a location defined only by the audio object position metadata. In some instances, for example, a large audio object should be perceived as occupying a significant portion of a playback environment, possibly even surrounding the listener.

The human hearing system is very sensitive to changes in the correlation or coherence of the signals arriving at both ears, and maps this correlation to a perceived object size attribute if the normalized correlation is smaller than the value of +1. Therefore, in order to create a convincing spatial object size, or spatial diffuseness, a significant proportion of the speaker signals in a playback environment should be mutually independent, or at least be uncorrelated (e.g. independent in terms of first-order cross correlation or covariance). A satisfactory decorrelation process is typically rather complex, normally involving time-variant filters.

A cinema sound track may include hundreds of objects, each with its associated position metadata, size metadata and possibly other spatial metadata. Moreover, a cinema sound system can include hundreds of loudspeakers, which may be individually controlled to provide satisfactory perception of audio object locations and sizes. In a cinema, therefore, hundreds of objects may be reproduced by hundreds of loudspeakers, and the object-to-loudspeaker signal mapping consists of a very large matrix of panning coefficients. When the number of objects is given by M, and the number of loudspeakers is given by N, this matrix has up to M*N elements. This has implications for the reproduction of diffuse or large-size objects. In order to create a convincing spatial object size, or spatial diffuseness, a significant proportion of the N loudspeaker signals should be mutually independent, or at least be uncorrelated. This generally involves the use of many (up to N) independent decorrelation processes, causing a significant processing load for the rendering process. Moreover, the amount of decorrelation may be different for each object, which further complicates the rendering process. A sufficiently complex rendering system, such as a rendering system for a commercial theater, may be capable of providing such decorrelation.

However, less complex rendering systems, such as those intended for home theater systems, may not be capable of providing adequate decorrelation. Some such rendering systems are not capable of providing decorrelation at all. Decorrelation programs that are simple enough to be executed on a home theater system can introduce artifacts. For example, comb-filter artifacts may be introduced if a low-complexity decorrelation process is followed by a downmix process.

Another potential problem is that in some applications, object-based audio is transmitted in the form of a backward-compatible mix (such as Dolby Digital or Dolby Digital Plus), augmented with additional information for retrieving one or more objects from that backward-compatible mix. The backward-compatible mix would normally not have the effect of decorrelation included. In some such systems, the reconstruction of objects may only work reliably if the backward-compatible mix was created using simple panning procedures. The use of decorrelators in such processes can harm the audio object reconstruction process, sometimes severely. In the past, this has meant that one could either choose not to apply decorrelation in the backward-compatible mix, thereby degrading the artistic intent of that mix, or accept degradation in the object reconstruction process.

In order to address such potential problems, some implementations described herein involve identifying diffuse or spatially large audio objects for special processing. Such methods and devices may be particularly suitable for audio data to be rendered in a home theater. However, these methods and devices are not limited to home theater use, but instead have broad applicability.

Due to their spatially diffuse nature, objects with a large size are not perceived as point sources with a compact and concise location. Therefore, multiple speakers are used to reproduce such spatially diffuse objects. However, the exact locations of the speakers in the playback environment that are used to reproduce large audio objects are less critical than the locations of speakers use to reproduce compact, small-sized audio objects. Accordingly, a high-quality reproduction of large audio objects is possible without prior knowledge about the actual playback speaker configuration used to eventually render decorrelated large audio object signals to actual speakers of the playback environment. Consequently, decorrelation processes for large audio objects can be performed "upstream," before the process of rendering audio data for reproduction in a playback environment, such as a home theater system, for listeners. In some examples, decorrelation processes for large audio objects are performed prior to encoding audio data for transmission to such playback environments.

Such implementations do not require the renderer of a playback environment to be capable of high-complexity decorrelation, thereby allowing for rendering processes that may be relatively simpler, more efficient and cheaper. Backward-compatible downmixes may include the effect of decorrelation to maintain the best possible artistic intent, without the need to reconstruct the object for rendering-side decorrelation. High-quality decorrelators can be applied to large audio objects upstream of a final rendering process, e.g., during an authoring or post-production process in a sound studio. Such decorrelators may be robust with regard to downmixing and/or other downstream audio processing.

Figure 5:
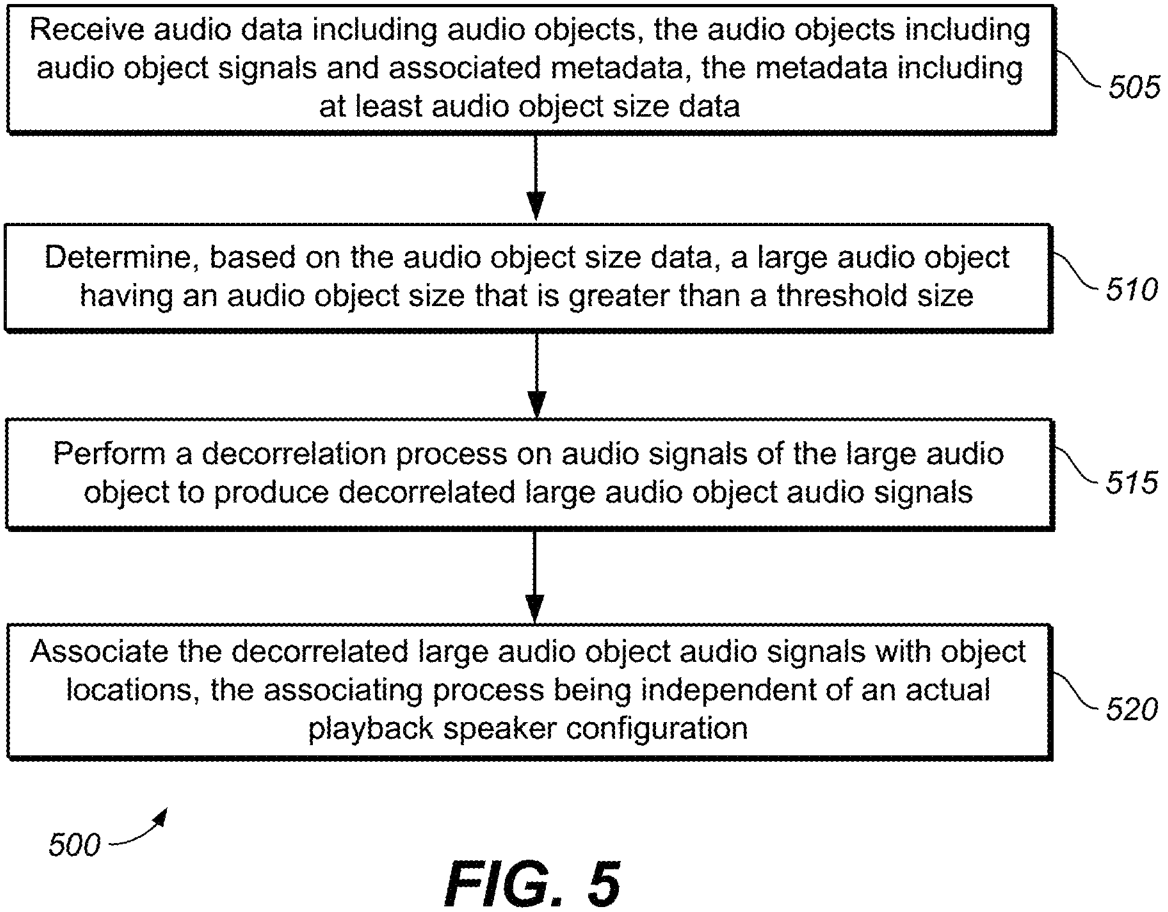
FIG. 5 is a flow diagram that provides an example of audio processing for spatially large audio objects.

FIG. 5 is a flow diagram that provides an example of audio processing for spatially large audio objects. The operations of method 500, as with other methods described herein, are not necessarily performed in the order indicated. Moreover, these methods may include more or fewer blocks than shown and/or described. These methods may be implemented, at least in part, by a logic system such as the logic system 1110 shown in FIG. 11 and described below. Such a logic system may be a component of an audio processing system. Alternatively, or additionally, such methods may be implemented via a non-transitory medium having software stored thereon. The software may include instructions for controlling one or more devices to perform, at least in part, the methods described herein.

In this example, method 500 begins with block 505, which involves receiving audio data including audio objects. The audio data may be received by an audio processing system. In this example, the audio objects include audio object signals and associated metadata. Here, the associated metadata includes audio object size data. The associated metadata also may include audio object position data indicating the position of the audio object in a three dimensional space, decorrelation metadata, audio object gain information, etc. The audio data also may include one or more audio bed signals corresponding to speaker locations.

In this implementation, block 510 involves determining, based on the audio object size data, a large audio object having an audio object size that is greater than a threshold size. For example, block 510 may involve determining whether a numerical audio object size value exceeds a predetermined level. The numerical audio object size value may, for example, correspond to a portion of a playback environment occupied by the audio object. Alternatively, or additionally, block 510 may involve determining whether another type of indication, such as a flag, decorrelation metadata, etc., indicates that an audio object has an audio object size that is greater than the threshold size. Although much of the discussion of method 500 involves processing a single large audio object, it will be appreciated that the same (or similar) processes may be applied to multiple large audio objects.

In this example, block 515 involves performing a decorrelation process on audio signals of a large audio object, producing decorrelated large audio object audio signals. In some implementations, the decorrelation process may be performed, at least in part, according to received decorrelation metadata. The decorrelation process may involve delays, all-pass filters, pseudo-random filters and/or reverberation algorithms.

Here, in block 520, the decorrelated large audio object audio signals are associated with object locations. In this example, the associating process is independent of an actual playback speaker configuration that may be used to eventually render the decorrelated large audio object audio signals to actual playback speakers of a playback environment. However, in some alternative implementations, the object locations may correspond with actual playback speaker locations. For example, according to some such alternative implementations, the object locations may correspond with playback speaker locations of commonly-used playback speaker configurations. If audio bed signals are received in block 505, the object locations may correspond with playback speaker locations corresponding to at least some of the audio bed signals. Alternatively, or additionally, the object locations may be locations corresponding to at least some of the audio object position data of the received audio objects. Accordingly, at least some of the object locations may be stationary, whereas at least some of the object locations may vary over time. In some implementations, block 520 may involve mixing the decorrelated large audio object audio signals with audio signals for audio objects that are spatially separated by a threshold distance from the large audio object.

In some implementations, block 520 may involve rendering the decorrelated large audio object audio signals according to virtual speaker locations. Some such implementations may involve computing contributions from virtual sources within an audio object area or volume defined by the large audio object position data and the large audio object size data. Such implementations may involve determining a set of audio object gain values for each of a plurality of output channels based, at least in part, on the computed contributions. Some examples are described below.

Some implementations may involve encoding audio data output from the associating process. According to some such implementations, the encoding process involves encoding audio object signals and associated metadata. In some implementations, the encoding process includes a data compression process. The data compression process may be lossless or lossy. In some implementations, the data compression process involves a quantization process. According to some examples, the encoding process does not involve encoding decorrelation metadata for the large audio object.

Some implementations involve performing an audio object clustering process, also referred to herein as a "scene simplification" process. For example, the audio object clustering process may be part of block 520. For implementations that involve encoding, the encoding process may involve encoding audio data that is output from the audio object clustering process. In some such implementations, the audio object clustering process may be performed after the decorrelation process. Further examples of processes corresponding to the blocks of method 500, including scene simplification processes, are provided below.

FIGS. 6A-6F are block diagrams that illustrate examples of components of audio processing systems that are capable of processing large audio objects as described herein. These components may, for example, correspond to modules of a logic system of an audio processing system, which may be implemented via hardware, firmware, software stored in one or more non-transitory media, or combinations thereof. The logic system may include one or more processors, such as general purpose single- or multi-chip processors. The logic system may include a digital signal processor (DSP), an application specific integrated circuit (ASIC), a field programmable gate array (FPGA) or other programmable logic device, discrete gate or transistor logic, discrete hardware components and/or combinations thereof.

Figure 6A:
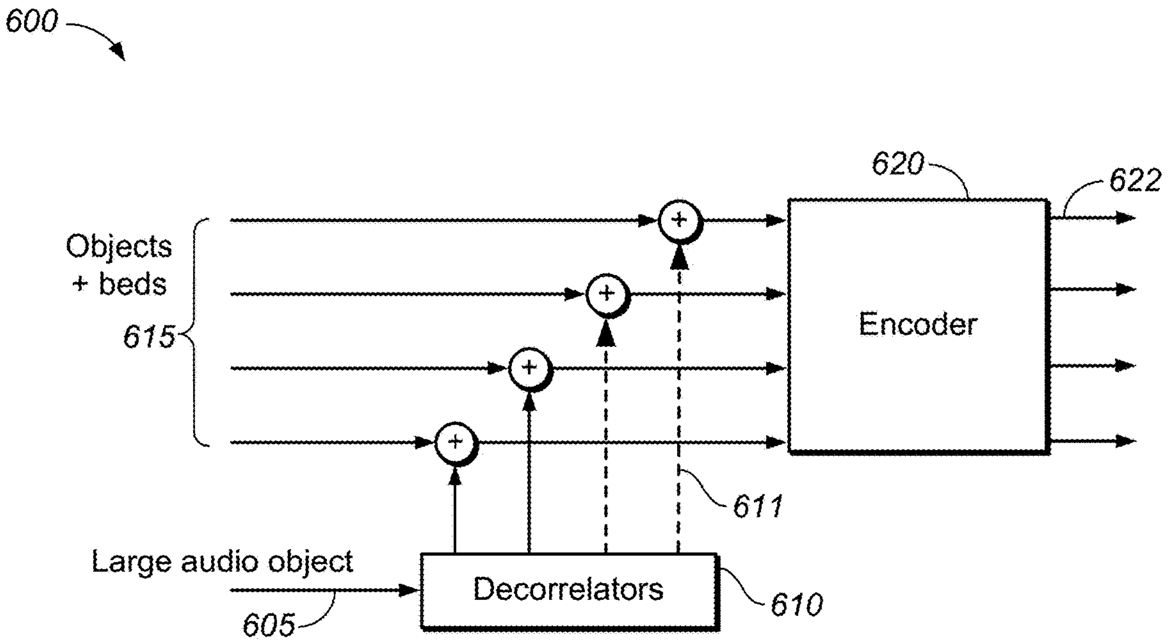
FIGS. 6A-6F are block diagrams that illustrate examples of components of an audio processing apparatus capable of processing large audio objects.

In FIG. 6A, the audio processing system 600 is capable of detecting large audio objects, such as the large audio object 605. The detection process may be substantially similar to one of the processes described with reference to block 510 of FIG. 5. In this example, audio signals of the large audio object 605 are decorrelated by the decorrelation system 610, to produce decorrelated large audio object signals 611. The decorrelation system 610 may perform the decorrelation process, at least in part, according to received decorrelation metadata for the large audio object 605. The decorrelation process may involve one or more of delays, all-pass filters, pseudo-random filters or reverberation algorithms.

The audio processing system 600 is also capable of receiving other audio signals, which are other audio objects and/or beds 615 in this example. Here, the other audio objects are audio objects that have a size that is below a threshold size for characterizing an audio object as being a large audio object.

In this example, the audio processing system 600 is capable of associating the decorrelated large audio object audio signals 611 with other object locations. The object locations may be stationary or may vary over time. The associating process may be similar to one or more of the processes described above with reference to block 520 of FIG. 5.

The associating process may involve a mixing process. The mixing process may be based, at least in part, on a distance between a large audio object location and another object location. In the implementation shown in FIG. 6A, the audio processing system 600 is capable of mixing the decorrelated large audio object signals 611 with at least some audio signals corresponding to the audio objects and/or beds 615. For example, the audio processing system 600 may be capable of mixing the decorrelated large audio object audio signals 611 with audio signals for other audio objects that are spatially separated by a threshold amount of distance from the large audio object.

In some implementations, the associating process may involve a rendering process. For example, the associating process may involve rendering the decorrelated large audio object audio signals according to virtual speaker locations. Some examples are described below. After the rendering process, there may be no need to retain the audio signals corresponding to the large audio object that were received by the decorrelation system 610. Accordingly, the audio processing system 600 may be configured for attenuating or deleting the audio signals of the large audio object 605 after the decorrelation process is performed by the decorrelation system 610. Alternatively, the audio processing system 600 may be configured for retaining at least a portion of the audio signals of the large audio object 605 (e.g., audio signals corresponding to a point source contribution of the large audio object 605) after the decorrelation process is performed.

In this example, the audio processing system 600 includes an encoder 620 that is capable of encoding audio data. Here, the encoder 620 is configured for encoding audio data after the associating process. In this implementation, the encoder 620 is capable of applying a data compression process to audio data. Encoded audio data 622 may be stored and/or transmitted to other audio processing systems for downstream processing, playback, etc.

Figure 6B:
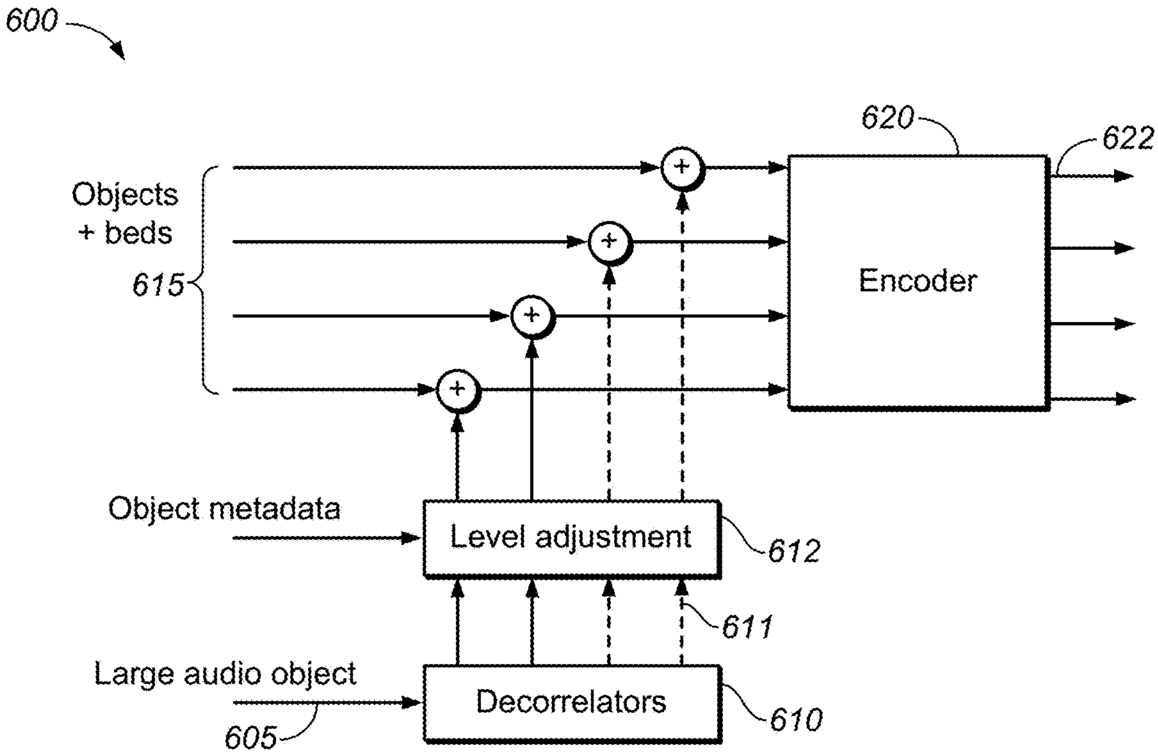

In the implementation shown in FIG. 6B, the audio processing system 600 is capable of level adjustment. In this example, the level adjustment system 612 is configured to adjust levels of the outputs of the decorrelation system 610. The level adjustment process may depend on the metadata of the audio objects in the original content. In this example, the level adjustment process depends, at least in part, on the audio object size metadata and the audio object position metadata of the large audio object 605. Such a level adjustment can be used to optimize the distribution of decorrelator output to other audio objects, such as the audio objects and/or beds 615. One may choose to mix decorrelator outputs to other object signals that are spatially distant, in order to improve the spatial diffuseness of the resulting rendering.

Alternatively, or additionally, the level adjustment process may be used to ensure that sounds corresponding to the decorrelated large audio object 605 are only reproduced by loudspeakers from a certain direction. This may be accomplished by only adding the decorrelator outputs to objects in the vicinity of the desired direction or location. In such implementations, the position metadata of the large audio object 605 is factored into the level adjustment process, in order to preserve information regarding the perceived direction from which its sounds are coming. Such implementations may be appropriate for objects of intermediate size, e.g., for audio objects that are deemed to be large but are not so large that their size includes the entire reproduction/playback environment.

Figure 6C:
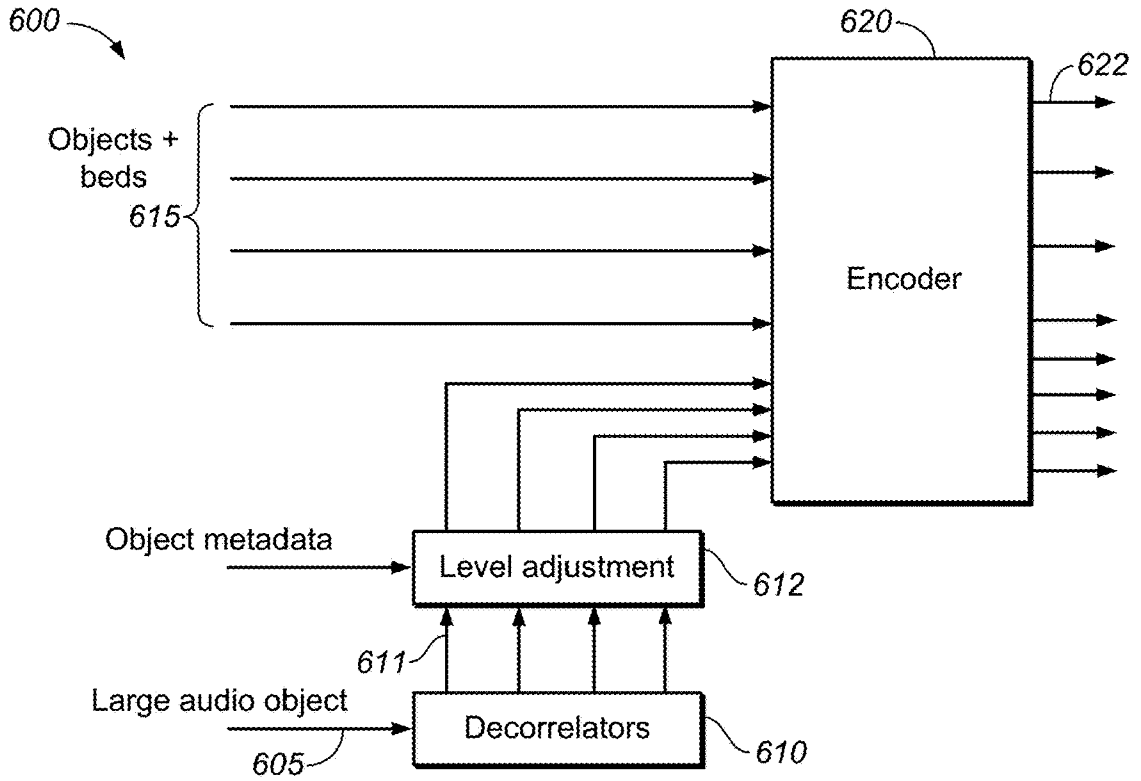

In the implementation shown in FIG. 6C, the audio processing system 600 is capable of creating additional objects or bed channels during the decorrelation process. Such functionality may be desirable, for example, if the other audio objects and/or beds 615 are not suitable or optimal. For example, in some implementations the decorrelated large audio object signals 611 may correspond to virtual speaker locations. If the other audio objects and/or beds 615 do not correspond to positions that are sufficiently close to the desired virtual speaker locations, the decorrelated large audio object signals 611 may correspond to new virtual speaker locations.

In this example, a large audio object 605 is first processed by the decorrelation system 610. Subsequently, additional objects or bed channels corresponding to the decorrelated large audio object signals 611 are provided to the encoder 620. In this example, the decorrelated large audio object signals 611 are subjected to level adjustment before being sent to the encoder 620. The decorrelated large audio object signals 611 may be bed channel signals and/or audio object signals, the latter of which may correspond to static or moving objects.

In some implementations, the audio signals output to the encoder 620 also may include at least some of the original large audio object signals. As noted above, the audio processing system 600 may be capable of retaining audio signals corresponding to a point source contribution of the large audio object 605 after the decorrelation process is performed. This may be beneficial, for example, because different signals may be correlated with one another to varying degrees. Therefore, it may be helpful to pass through at least a portion of the original audio signal corresponding to the large audio object 605 (for example, the point source contribution) and render that separately. In such implementations, it can be advantageous to level the decorrelated signals and the original signals corresponding to the large audio object 605.

Figure 6D:
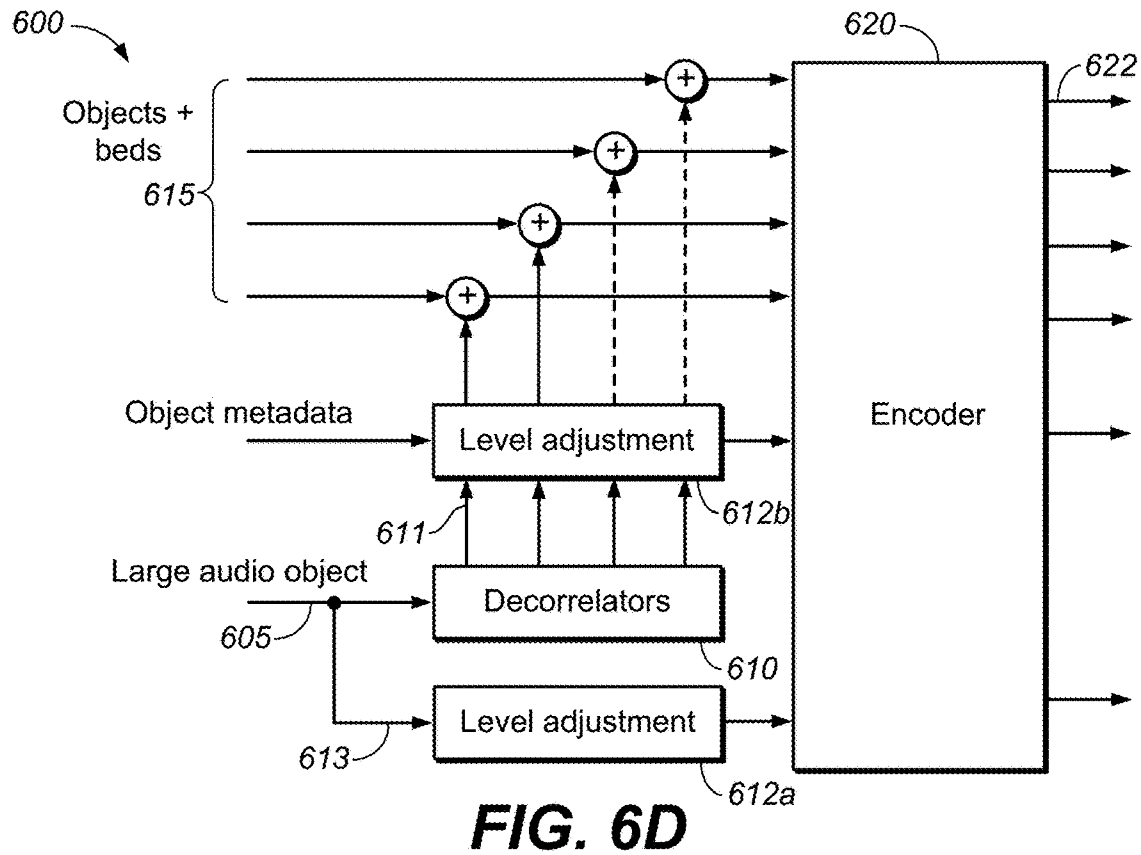

One such example is shown in FIG. 6D. In this example, at least some of the original large audio object signals 613 are subjected to a first leveling process by the level adjustment system 612*a*, and the decorrelated large audio object signals 611 are subjected to leveling process by the level adjustment system 612*b*. Here, the level adjustment system 612*a* and the level adjustment system 612*b* provide output audio signals to the encoder 620. The output of the level adjustment system 612*b* is also mixed with the other audio objects and/or beds 615 in this example.

In some implementations, the audio processing system 600 may be capable of evaluating input audio data to determine (or at least to estimate) content type. The decorrelation process may be based, at least in part, on the content type. In some implementations, the decorrelation process may be selectively performed according to the content type. For example, an amount of decorrelation to be performed on the input audio data may depend, at least in part, on the content type. For example, one would generally want to reduce the amount of decorrelation for speech.

Figure 6E:
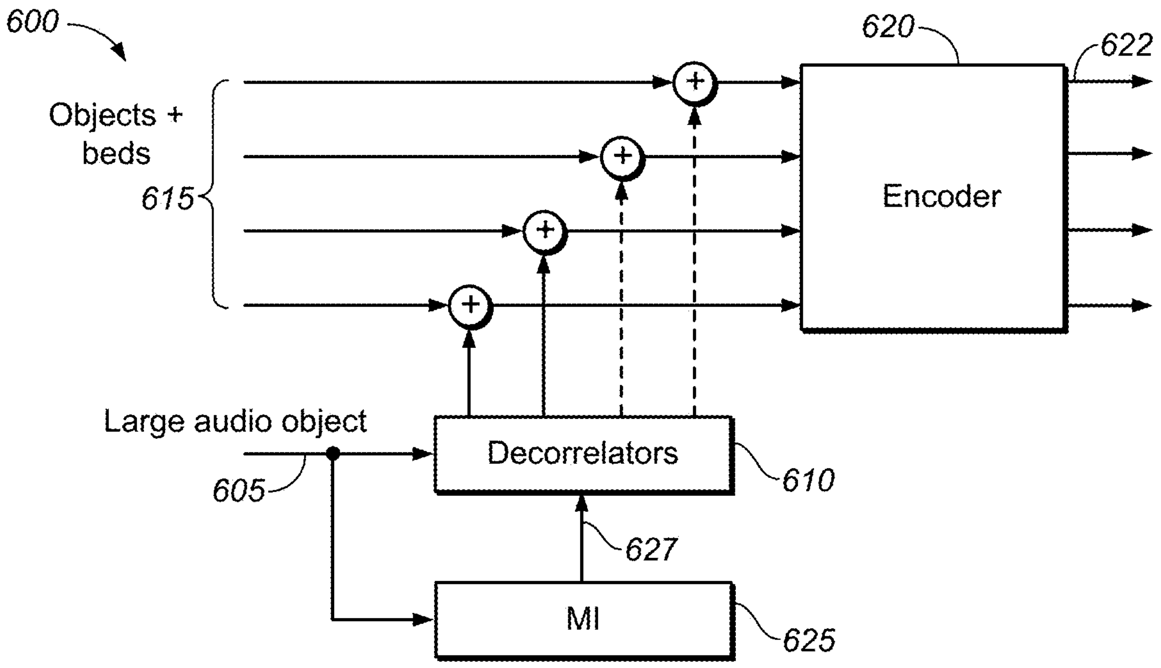
Figure 6F:
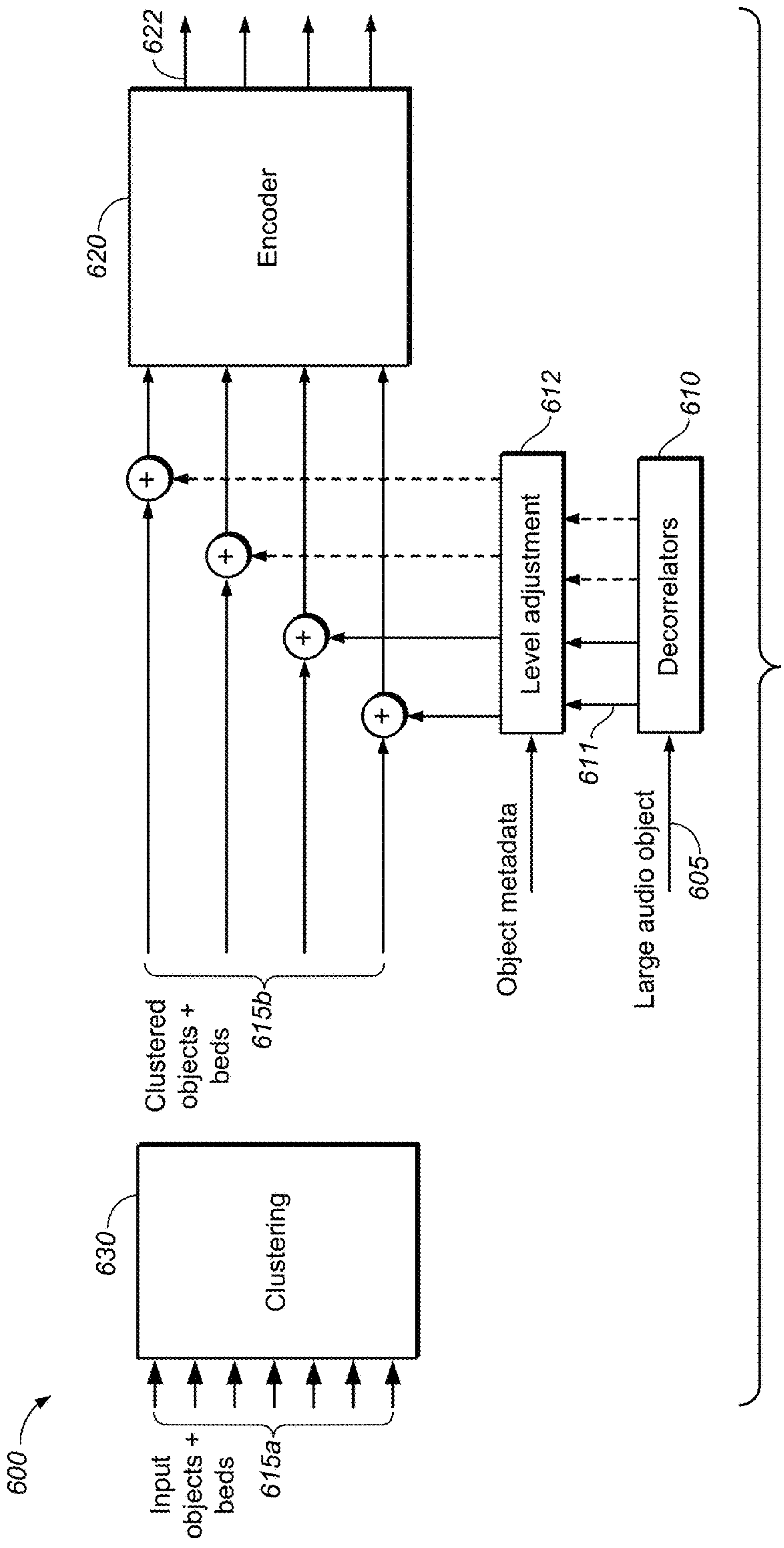

One example is shown in FIG. 6E. In this example, the media intelligence system 625 is capable of evaluating audio signals and estimating the content type. For example, the media intelligence system 625 may be capable of evaluating audio signals corresponding to large audio objects 605 and estimating whether the content type is speech, music, sound effects, etc. In the example shown in FIG. 6E, the media intelligence system 625 is capable of sending control signals 627 to control the amount of decorrelation or size processing of an object according to the estimation of content type.

For example, if the media intelligence system 625 estimates that the audio signals of the large audio object 605 correspond to speech, the media intelligence system 625 may send control signals 627 indicating that the amount of decorrelation for these signals should be reduced or that these signals should not be decorrelated. Various methods of automatically determining the likelihood of a signal being a speech signal may be used. According to one embodiment, the media intelligence system 625 may include a speech likelihood estimator that is capable of generating a speech likelihood value based, at least in part, on audio information in a center channel. Some examples are described by Robinson and Vinton in "Automated Speech/Other Discrimination for Loudness Monitoring" (Audio Engineering Society, Preprint number 6437 of Convention 118, May 2005).

In some implementations, the control signals 627 may indicate an amount of level adjustment and/or may indicate parameters for mixing the decorrelated large audio object signals 611 with audio signals for the audio objects and/or beds 615.

Alternatively, or additionally, an amount of decorrelation for a large audio object may be based on "stems," "tags" or other express indications of content type. Such express indications of content type may, for example, be created by a content creator (e.g., during a post-production process) and transmitted as metadata with the corresponding audio signals. In some implementations, such metadata may be human-readable. For example, a human-readable stem or tag may expressly indicate, in effect, "this is dialogue," "this is a special effect," "this is music," etc.

Some implementations may involve a clustering process that combines objects that are similar in some respect, for example in terms of spatial location, spatial size, or content type. Some examples of clustering are described below with reference to FIGS. 7 and 8. In the example shown in FIG. 6F, the objects and/or beds 615*a* are input to a clustering process 630. A smaller number of objects and/or beds 615*b* are output from the clustering process 630. Audio data corresponding to the objects and/or beds 615*b* are mixed with the leveled decorrelated large audio object signals 611. In some alternative implementations, a clustering process may follow the decorrelation process. One example is described below with reference to FIG. 9. Such implementations may, for example, prevent dialogue from being mixed into a cluster with undesirable metadata, such as a position not near the center speaker, or a large cluster size.

Scene Simplification Through Object Clustering

For purposes of the following description, the terms "clustering" and "grouping" or "combining" are used interchangeably to describe the combination of objects and/or beds (channels) to reduce the amount of data in a unit of adaptive audio content for transmission and rendering in an adaptive audio playback system; and the term "reduction" may be used to refer to the act of performing scene simplification of adaptive audio through such clustering of objects and beds. The terms "clustering," "grouping" or "combining" throughout this description are not limited to a strictly unique assignment of an object or bed channel to a single cluster only, instead, an object or bed channel may be distributed over more than one output bed or cluster using weights or gain vectors that determine the relative contribution of an object or bed signal to the output cluster or output bed signal.

In an embodiment, an adaptive audio system includes at least one component configured to reduce bandwidth of object-based audio content through object clustering and perceptually transparent simplifications of the spatial scenes created by the combination of channel beds and objects. An object clustering process executed by the component(s) uses certain information about the objects that may include spatial position, object content type, temporal attributes, object size and/or the like, to reduce the complexity of the spatial scene by grouping like objects into object clusters that replace the original objects.

The additional audio processing for standard audio coding to distribute and render a compelling user experience based on the original complex bed and audio tracks is generally referred to as scene simplification and/or object clustering. The main purpose of this processing is to reduce the spatial scene through clustering or grouping techniques that reduce the number of individual audio elements (beds and objects) to be delivered to the reproduction device, but that still retain enough spatial information so that the perceived difference between the originally authored content and the rendered output is minimized.

The scene simplification process can facilitate the rendering of object-plus-bed content in reduced bandwidth channels or coding systems using information about the objects such as spatial position, temporal attributes, content type, size and/or other appropriate characteristics to dynamically cluster objects to a reduced number. This process can reduce the number of objects by performing one or more of the following clustering operations: (1) clustering objects to objects; (2) clustering object with beds; and (3) clustering objects and/or beds to objects. In addition, an object can be distributed over two or more clusters. The process may use temporal information about objects to control clustering and de-clustering of objects.

In some implementations, object clusters replace the individual waveforms and metadata elements of constituent objects with a single equivalent waveform and metadata set, so that data for N objects is replaced with data for a single object, thus essentially compressing object data from N to 1. Alternatively, or additionally, an object or bed channel may be distributed over more than one cluster (for example, using amplitude panning techniques), reducing object data from N to M, with $M<N$. The clustering process may use an error metric based on distortion due to a change in location, loudness or other characteristic of the clustered objects to determine a tradeoff between clustering compression versus sound degradation of the clustered objects. In some embodiments, the clustering process can be performed synchronously. Alternatively, or additionally, the clustering process may be event-driven, such as by using auditory scene analysis (ASA) and/or event boundary detection to control object simplification through clustering.

In some embodiments, the process may utilize knowledge of endpoint rendering algorithms and/or devices to control clustering. In this way, certain characteristics or properties of the playback device may be used to inform the clustering process. For example, different clustering schemes may be utilized for speakers versus headphones or other audio drivers, or different clustering schemes may be used for lossless versus lossy coding, and so on.

Figure 7:
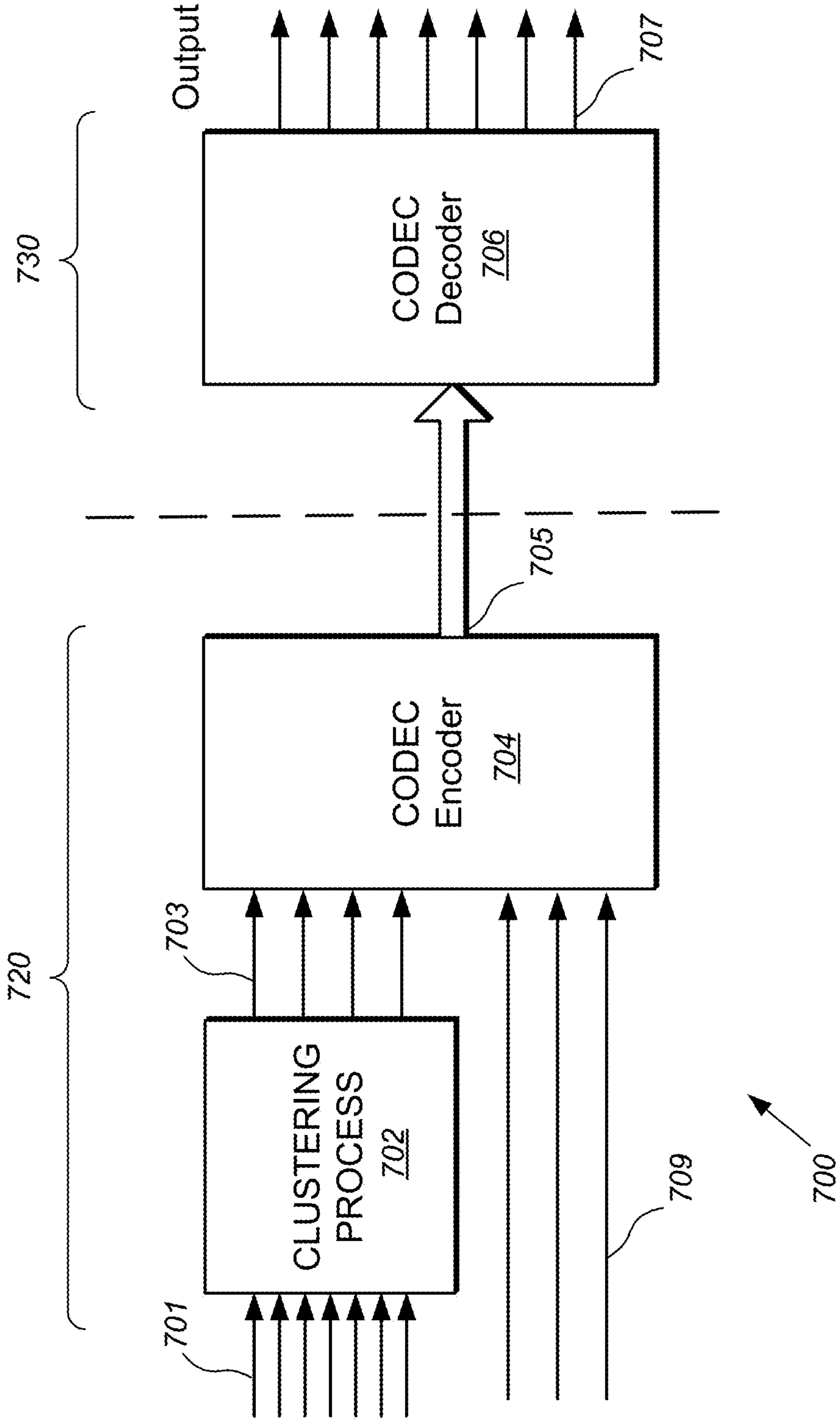
FIG. 7 is a block diagram that shows an example of a system capable of executing a clustering process.

FIG. 7 is a block diagram that shows an example of a system capable of executing a clustering process. As shown in FIG. 7, system 700 includes encoder 704 and decoder 706 stages that process input audio signals to produce output audio signals at a reduced bandwidth. In some implementations, the portion 720 and the portion 730 may be in different locations. For example, the portion 720 may correspond to a post-production authoring system and the portion 730 may correspond to a playback environment, such as a home theater system. In the example shown in FIG. 7, a portion 709 of the input signals is processed through known compression techniques to produce a compressed audio bitstream 705. The compressed audio bitstream 705 may be decoded by decoder stage 706 to produce at least a portion of output 707. Such known compression techniques may involve analyzing the input audio content 709, quantizing the audio data and then performing compression techniques, such as masking, etc., on the audio data itself. The compression techniques may be lossy or lossless and may be implemented in systems that may allow the user to select a compressed bandwidth, such as 192 kbps, 256 kbps, 512 kbps, etc.

In an adaptive audio system, at least a portion of the input audio comprises input signals 701 that include audio objects, which in turn include audio object signals and associated metadata. The metadata defines certain characteristics of the associated audio content, such as object spatial position, object size, content type, loudness, and so on. Any practical number of audio objects (e.g., hundreds of objects) may be processed through the system for playback. To facilitate accurate playback of a multitude of objects in a wide variety of playback systems and transmission media, system 700 includes a clustering process or component 702 that reduces the number of objects into a smaller, more manageable number of objects by combining the original objects into a smaller number of object groups.

The clustering process thus builds groups of objects to produce a smaller number of output groups 703 from an original set of individual input objects 701. The clustering process 702 essentially processes the metadata of the objects as well as the audio data itself to produce the reduced number of object groups. The metadata may be analyzed to determine which objects at any point in time are most appropriately combined with other objects, and the corresponding audio waveforms for the combined objects may be summed together to produce a substitute or combined object. In this example, the combined object groups are then input to the encoder 704, which is configured to generate a bitstream 705 containing the audio and metadata for transmission to the decoder 706.

In general, the adaptive audio system incorporating the object clustering process 702 includes components that generate metadata from the original spatial audio format. The system 700 comprises part of an audio processing system configured to process one or more bitstreams containing both conventional channel-based audio elements and audio object coding elements. An extension layer containing the audio object coding elements may be added to the channel-based audio codec bitstream or to the audio object bitstream. Accordingly, in this example the bitstreams 705 include an extension layer to be processed by renderers for use with existing speaker and driver designs or next generation speakers utilizing individually addressable drivers and driver definitions.

The spatial audio content from the spatial audio processor may include audio objects, channels, and position metadata. When an object is rendered, it may be assigned to one or more speakers according to the position metadata and the location of the playback speakers. Additional metadata, such as size metadata, may be associated with the object to alter the playback location or otherwise limit the speakers that are to be used for playback. Metadata may be generated in the audio workstation in response to the engineer's mixing inputs to provide rendering cues that control spatial parameters (e.g., position, size, velocity, intensity, timbre, etc.) and specify which driver(s) or speaker(s) in the listening environment play respective sounds during exhibition. The metadata may be associated with the respective audio data in the workstation for packaging and transport by spatial audio processor.

Figure 8:
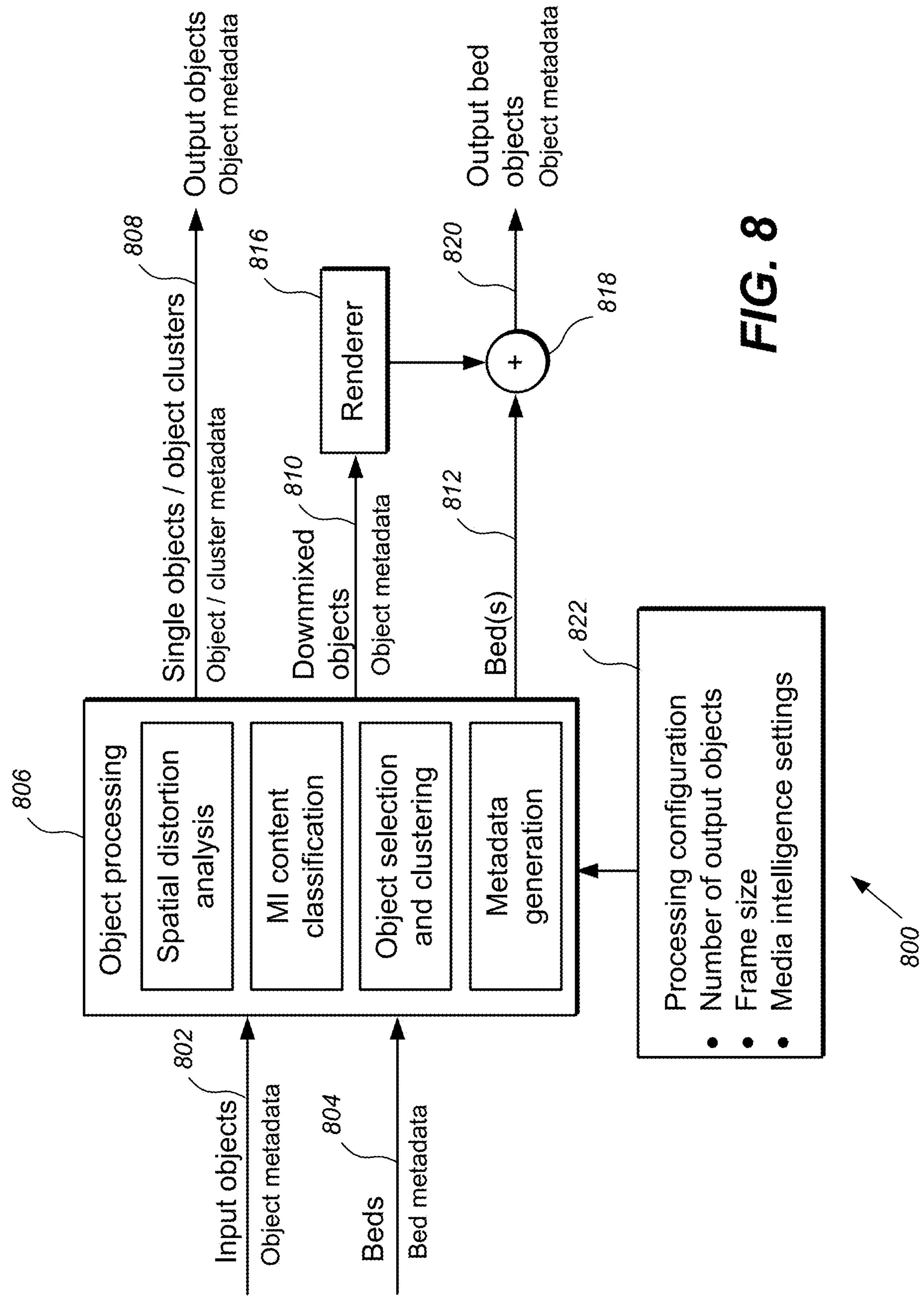
FIG. 8 is a block diagram that illustrates an example of a system capable of clustering objects and/or beds in an adaptive audio processing system.

FIG. 8 is a block diagram that illustrates an example of a system capable of clustering objects and/or beds in an adaptive audio processing system. In the example shown in FIG. 8, an object processing component 806, which is capable of performing scene simplification tasks, reads in an arbitrary number of input audio files and metadata. The input audio files comprise input objects 802 and associated object metadata, and may include beds 804 and associated bed metadata. This input file/metadata thus correspond to either "bed" or "object" tracks.

In this example, the object processing component 806 is capable of combining media intelligence/content classification, spatial distortion analysis and object selection/clustering information to create a smaller number of output objects and bed tracks. In particular, objects can be clustered together to create new equivalent objects or object clusters 808, with associated object/cluster metadata. The objects can also be selected for downmixing into beds. This is shown in FIG. 8 as the output of downmixed objects 810 input to a renderer 816 for combination 818 with beds 812 to form output bed objects and associated metadata 820. The output bed configuration 820 (e.g., a Dolby 5.1 configuration) does not necessarily need to match the input bed configuration, which for example could be 9.1 for Atmos cinema. In this example, new metadata are generated for the output tracks by combining metadata from the input tracks and new audio data are also generated for the output tracks by combining audio from the input tracks.

In this implementation, the object processing component 806 is capable of using certain processing configuration information 822. Such processing configuration information 822 may include the number of output objects, the frame size and certain media intelligence settings. Media intelligence can involve determining parameters or characteristics of (or associated with) the objects, such as content type (i.e., dialog/music/effects/etc.), regions (segment/classification), preprocessing results, auditory scene analysis results, and other similar information. For example, the object processing component 806 may be capable of determining which audio signals correspond to speech, music and/or special effects sounds. In some implementations, the object processing component 806 is capable of determining at least some such characteristics by analyzing audio signals. Alternatively, or additionally, the object processing component 806 may be capable of determining at least some such characteristics according to associated metadata, such as tags, labels, etc.

In an alternative embodiment, audio generation could be deferred by keeping a reference to all original tracks as well as simplification metadata (e.g., which objects belongs to which cluster, which objects are to be rendered to beds, etc.). Such information may, for example, be useful for distributing functions of a scene simplification process between a studio and an encoding house, or other similar scenarios.

Figure 9:
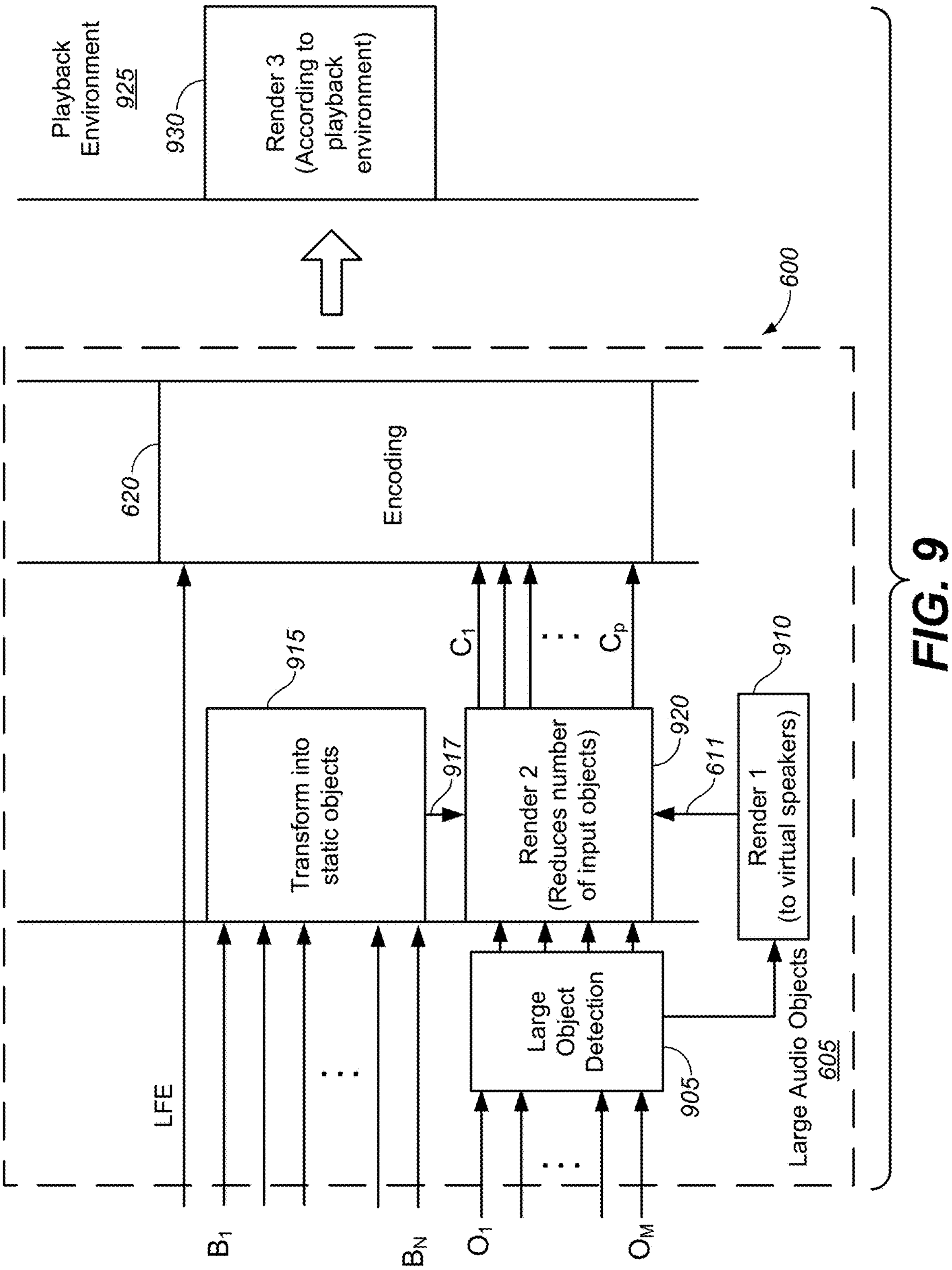
FIG. 9 is a block diagram that provides an example of a clustering process following a decorrelation process for large audio objects.

FIG. 9 is a block diagram that provides an example of a clustering process following a decorrelation process for large audio objects. The blocks of the audio processing system 600 may be implemented via any appropriate combination of hardware, firmware, software stored in non-transitory media, etc. For example, the blocks of the audio processing system 600 may be implemented via a logic system and/or other elements such as those described below with reference to FIG. 11.

In this implementation, the audio processing system 600 receives audio data that includes audio objects $O_1$ through $O_M$. Here, the audio objects include audio object signals and associated metadata, including at least audio object size metadata. The associated metadata also may include audio object position metadata. In this example, the large object detection module 905 is capable of determining, based at least in part on the audio object size metadata, large audio objects 605 that have a size that is greater than a threshold size. The large object detection module 905 may function, for example, as described above with reference to block 510 of FIG. 5.

In this implementation, the module 910 is capable of performing a decorrelation process on audio signals of the large audio objects 605 to produce decorrelated large audio object audio signals 611. In this example, the module 910 is also capable of rendering the audio signals of the large audio objects 605 to virtual speaker locations. Accordingly, in this example the decorrelated large audio object audio signals 611 output by the module 910 correspond with virtual speaker locations. Some examples of rendering audio object signals to virtual speaker locations will now be described with reference to FIGS. 10A and 10B.

Figure 10A:
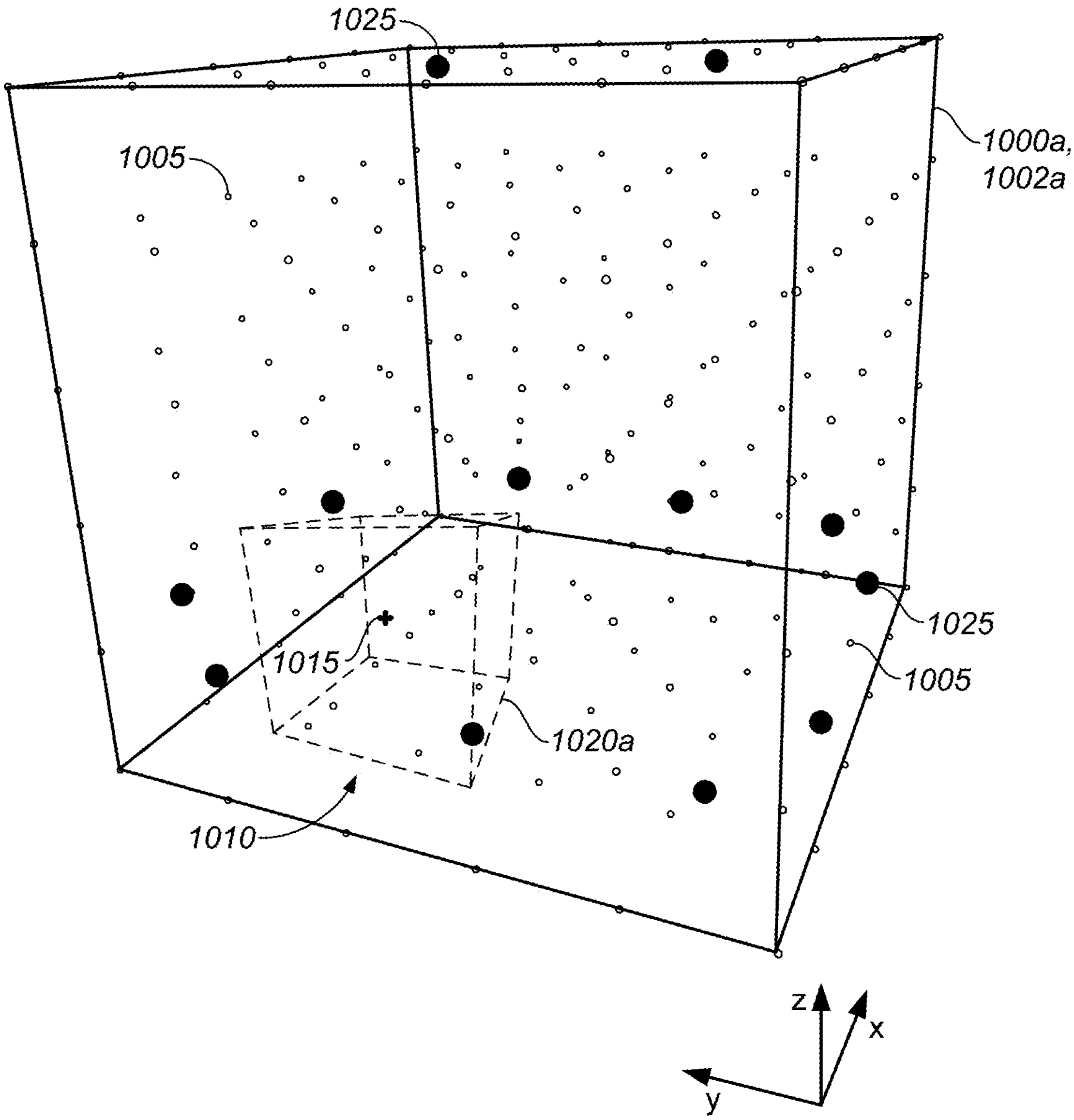
FIG. 10A shows an example of virtual source locations relative to a playback environment.

FIG. 10A shows an example of virtual source locations relative to a playback environment. The playback environment may be an actual playback environment or a virtual playback environment. The virtual source locations 1005 and the speaker locations 1025 are merely examples. However, in this example the playback environment is a virtual playback environment and the speaker locations 1025 correspond to virtual speaker locations.

In some implementations, the virtual source locations 1005 may be spaced uniformly in all directions. In the example shown in FIG. 10A, the virtual source locations 1005 are spaced uniformly along x, y and z axes. The virtual source locations 1005 may form a rectangular grid of $N_x$ by $N_y$ by $N_z$ virtual source locations 1005. In some implementations, the value of N may be in the range of 5 to 100. The value of N may depend, at least in part, on the number of speakers in the playback environment (or expected to be in the playback environment): it may be desirable to include two or more virtual source locations 1005 between each speaker location.

However, in alternative implementations, the virtual source locations 1005 may be spaced differently. For example, in some implementations the virtual source locations 1005 may have a first uniform spacing along the x and y axes and a second uniform spacing along the z axis. In other implementations, the virtual source locations 1005 may be spaced non-uniformly.

In this example, the audio object volume 1020*a* corresponds to the size of the audio object. The audio object 1010 may be rendered according to the virtual source locations 1005 enclosed by the audio object volume 1020*a*. In the example shown in FIG. 10A, the audio object volume 1020*a* occupies part, but not all, of the playback environment 1000*a*. Larger audio objects may occupy more of (or all of) the playback environment 1000*a*. In some examples, if the audio object 1010 corresponds to a point source, the audio object 1010 may have a size of zero and the audio object volume 1020*a* may be set to zero.

According to some such implementations, an authoring tool may link audio object size with decorrelation by indicating (e.g., via a decorrelation flag included in associated metadata) that decorrelation should be turned on when the audio object size is greater than or equal to a size threshold value and that decorrelation should be turned off if the audio object size is below the size threshold value. In some implementations, decorrelation may be controlled (e.g., increased, decreased or disabled) according to user input regarding the size threshold value and/or other input values.

In this example, the virtual source locations 1005 are defined within a virtual source volume 1002. In some implementations, the virtual source volume may correspond with a volume within which audio objects can move. In the example shown in FIG. 10A, the playback environment 1000*a* and the virtual source volume 1002*a* are co-extensive, such that each of the virtual source locations 1005 corresponds to a location within the playback environment 1000*a*. However, in alternative implementations, the playback environment 1000*a* and the virtual source volume 1002 may not be co-extensive.

Figure 10B:
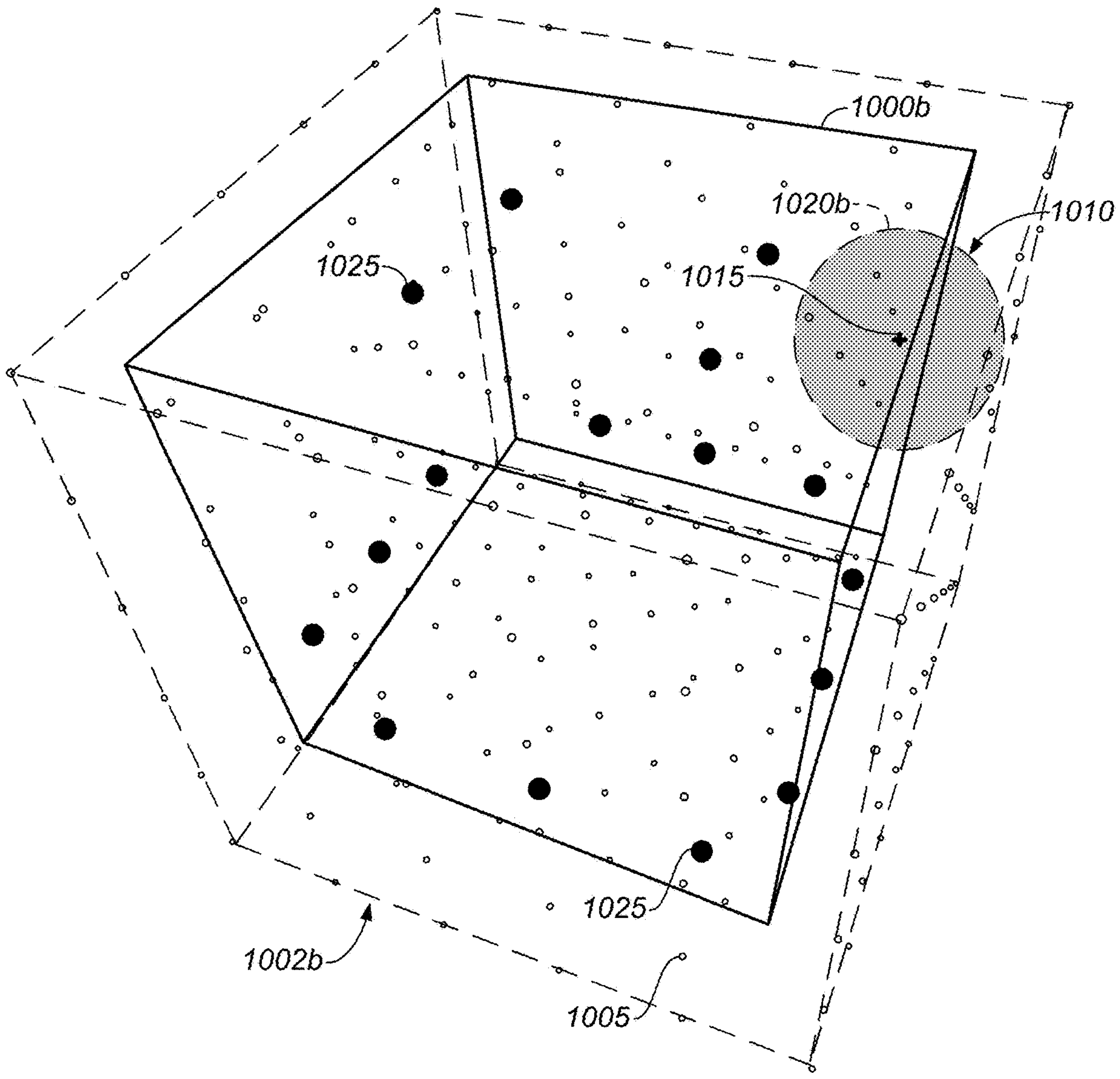
FIG. 10B shows an alternative example of virtual source locations relative to a playback environment.

For example, at least some of the virtual source locations 1005 may correspond to locations outside of the playback environment. FIG. 10B shows an alternative example of virtual source locations relative to a playback environment. In this example, the virtual source volume 1002*b* extends outside of the playback environment 1000*b*. Some of the virtual source locations 1005 within the audio object volume 1020*b* are located inside of the playback environment 1000*b* and other virtual source locations 1005 within the audio object volume 1020*b* are located outside of the playback environment 1000*b*.

In other implementations, the virtual source locations 1005 may have a first uniform spacing along x and y axes and a second uniform spacing along a z axis. The virtual source locations 1005 may form a rectangular grid of $N_x$ by $N_y$ by $M_z$ virtual source locations 1005. For example, in some implementations there may be fewer virtual source locations 1005 along the z axis than along the x or y axes. In some such implementations, the value of N may be in the range of 10 to 100, whereas the value of M may be in the range of 5 to 10.

Some implementations involve computing gain values for each of the virtual source locations 1005 within an audio object volume 1020. In some implementations, gain values for each channel of a plurality of output channels of a playback environment (which may be an actual playback environment or a virtual playback environment) will be computed for each of the virtual source locations 1005 within an audio object volume 1020. In some implementations, the gain values may be computed by applying a vector-based amplitude panning ("VBAP") algorithm, a pairwise panning algorithm or a similar algorithm to compute gain values for point sources located at each of the virtual source locations 1005 within an audio object volume 1020. In other implementations, a separable algorithm, to compute gain values for point sources located at each of the virtual source locations 1005 within an audio object volume 1020. As used herein, a "separable" algorithm is one for which the gain of a given speaker can be expressed as a product of multiple factors (e.g., three factors), each of which depends only on one of the coordinates of the virtual source location 1005. Examples include algorithms implemented in various existing mixing console panners, including but not limited to the Pro Tools™ software and panners implemented in digital film consoles provided by AMS Neve.

Returning again to FIG. 9, in this example the audio processing system 600 also receives bed channels $B_1$ through $B_N$, as well as a low-frequency effects (LFE) channel. The audio objects and bed channels are processed according to a scene simplification or "clustering" process, e.g., as described above with reference to FIGS. 7 and 8. However, in this example the LFE channel is not input to a clustering process, but instead is passed through to the encoder 620.

In this implementation, the bed channels $B_1$ through $B_N$ are transformed into static audio objects 917 by the module 915. The module 920 receives the static audio objects 917, in addition to audio objects that the large object detection module 905 has determined not to be large audio objects. Here, the module 920 also receives the decorrelated large audio object signals 611, which correspond to virtual speaker locations in this example.

In this implementation, the module 920 is capable of rendering the static objects 917, the received audio objects and the decorrelated large audio object signals 611 to clusters $C_1$ through $C_P$. In general, the module 920 will output a smaller number of clusters than the number of audio objects received. In this implementation, the module 920 is capable of associating the decorrelated large audio object signals 611 with locations of appropriate clusters, e.g., as described above with reference to block 520 of FIG. 5.

In this example, the clusters $C_1$ through $C_P$ and the audio data of the LFE channel are encoded by the encoder 620 and transmitted to the playback environment 925. In some implementations, the playback environment 925 may include a home theater system. The audio processing system 930 is capable of receiving and decoding the encoded audio data, as well as rendering the decoded audio data according to the actual playback speaker configuration of the playback environment 925, e.g., the speaker positions, speaker capabilities (e.g., bass reproduction capabilities), etc., of the actual playback speakers of the playback environment 925.

Figure 11:
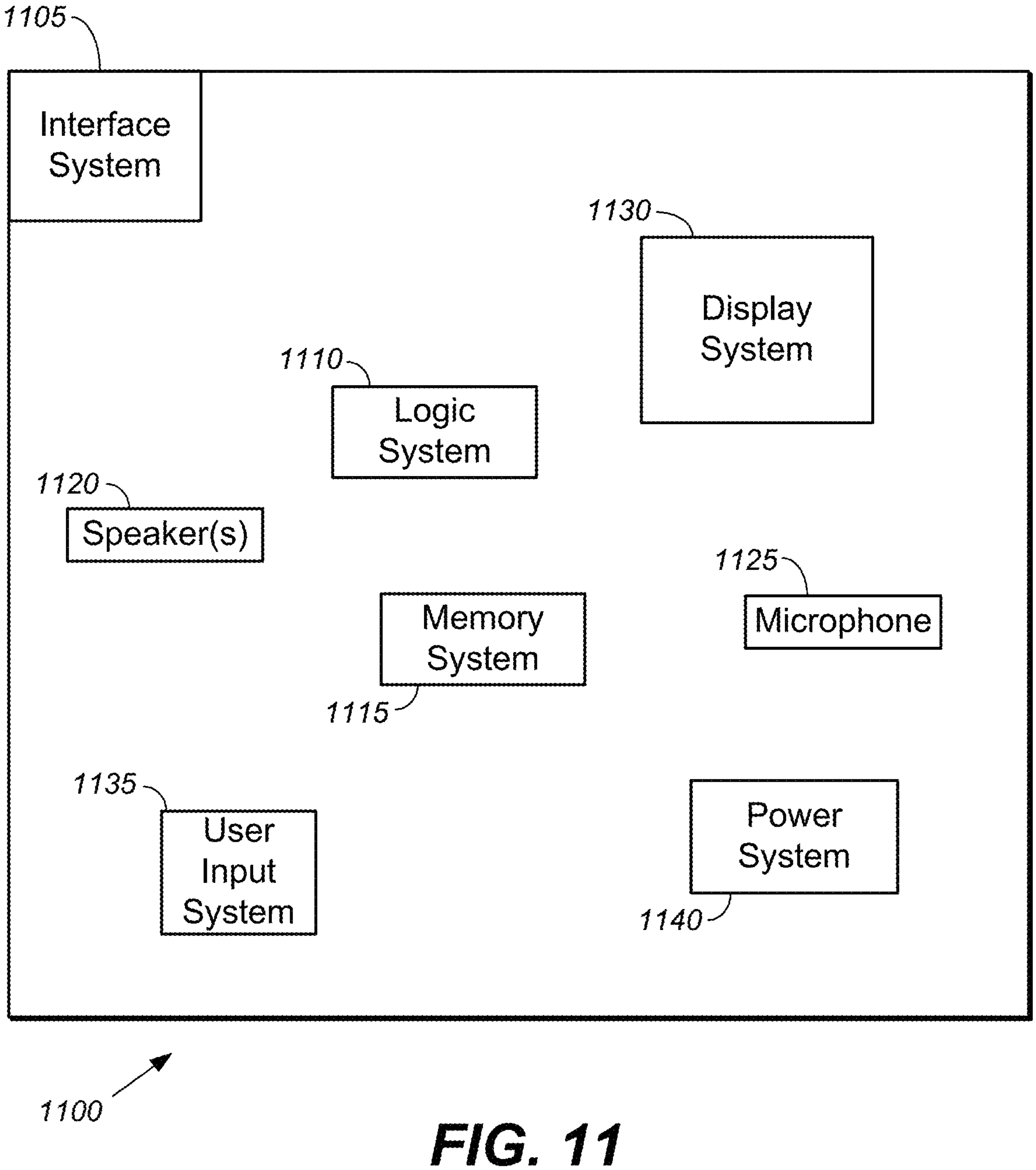
FIG. 11 is a block diagram that provides examples of components of an audio processing apparatus.

FIG. 11 is a block diagram that provides examples of components of an audio processing system. In this example, the audio processing system 1100 includes an interface system 1105. The interface system 1105 may include a network interface, such as a wireless network interface. Alternatively, or additionally, the interface system 1105 may include a universal serial bus (USB) interface or another such interface.

The audio processing system 1100 includes a logic system 1110. The logic system 1110 may include a processor, such as a general purpose single- or multi-chip processor. The logic system 1110 may include a digital signal processor (DSP), an application specific integrated circuit (ASIC), a field programmable gate array (FPGA) or other programmable logic device, discrete gate or transistor logic, or discrete hardware components, or combinations thereof. The logic system 1110 may be configured to control the other components of the audio processing system 1100. Although no interfaces between the components of the audio processing system 1100 are shown in FIG. 11, the logic system 1110 may be configured with interfaces for communication with the other components. The other components may or may not be configured for communication with one another, as appropriate.

The logic system 1110 may be configured to perform audio processing functionality, including but not limited to the types of functionality described herein. In some such implementations, the logic system 1110 may be configured to operate (at least in part) according to software stored one or more non-transitory media. The non-transitory media may include memory associated with the logic system 1110, such as random access memory (RAM) and/or read-only memory (ROM). The non-transitory media may include memory of the memory system 1115. The memory system 1115 may include one or more suitable types of non-transitory storage media, such as flash memory, a hard drive, etc.

The display system 1130 may include one or more suitable types of display, depending on the manifestation of the audio processing system 1100. For example, the display system 1130 may include a liquid crystal display, a plasma display, a bistable display, etc.

The user input system 1135 may include one or more devices configured to accept input from a user. In some implementations, the user input system 1135 may include a touch screen that overlays a display of the display system 1130. The user input system 1135 may include a mouse, a track ball, a gesture detection system, a joystick, one or more GUIs and/or menus presented on the display system 1130, buttons, a keyboard, switches, etc. In some implementations, the user input system 1135 may include the microphone 1125: a user may provide voice commands for the audio processing system 1100 via the microphone 1125. The logic system may be configured for speech recognition and for controlling at least some operations of the audio processing system 1100 according to such voice commands. In some implementations, the user input system 1135 may be considered to be a user interface and therefore as part of the interface system 1105.

The power system 1140 may include one or more suitable energy storage devices, such as a nickel-cadmium battery or a lithium-ion battery. The power system 1140 may be configured to receive power from an electrical outlet.

Various modifications to the implementations described in this disclosure may be readily apparent to those having ordinary skill in the art. The general principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The invention claimed is:

1. A method for audio processing, the method comprising:

receiving audio data comprising at least one low frequency (LFE) channel, at least one audio object, and audio object metadata, wherein the audio object metadata is associated with the at least one audio object, wherein the audio object metadata comprises a size of the at least one audio object and a flag indicating whether the at least one audio object is spatially diffuse;

performing, based on a determination that the at least one audio object is spatially diffuse indicating that the at least one audio object has a perceived size larger than a threshold in a playback environment, decorrelation filtering on the at least one audio object to determine decorrelated audio object audio signals, wherein each of the decorrelated audio object audio signals corresponds to at least a reproduction loudspeaker of a plurality of reproduction loudspeakers;

outputting the decorrelated audio object audio signals; and outputting the LFE channel.

2. The method of claim 1, wherein the at least one audio object is associated with at least one object location, wherein at least one of the at least one object location is stationary.

3. The method of claim 1, wherein the at least one audio object is associated with at least one object location, wherein at least one of the at least one object location varies over time.

4. The method of claim 1, further comprising applying a level adjustment process to the decorrelated audio object audio signals.

5. The method of claim 1, wherein performing decorrelation filtering includes at least one of a delay and a filter.

6. The method of claim 1, wherein performing decorrelation filtering includes at least one of an all-pass filter and a pseudo-random filter.

7. The method of claim 1, wherein performing decorrelation filtering includes a reverberation process.

8. A computer program product comprising a physical, non-transitory computer-readable medium storing instructions for performing the method of claim 1.

9. An apparatus for audio processing, the apparatus comprising:

a receiver configured to receive audio data comprising at least one low frequency (LFE) channel, at least one audio object, and audio object metadata, wherein the audio object metadata is associated with the at least one audio object, wherein the audio object metadata comprises a size of the at least one audio object and a flag indicating whether the at least one audio object is spatially diffuse; and a decorrelator configured to perform, based on a determination that the at least one audio object is spatially diffuse indicating that the at least one audio object has a perceived size larger than a threshold in a playback environment, decorrelation filtering on the at least one audio object to determine decorrelated audio object audio signals, wherein each of the decorrelated audio object audio signals corresponds to at least a reproduction loudspeaker of a plurality of reproduction loudspeakers;

a first output unit for outputting the decorrelated audio object audio signals; and a second output unit for outputting the LFE channel.

* * * * *